(12) United States Patent
Furukawa et al.

(10) Patent No.: US 11,050,762 B2
(45) Date of Patent: Jun. 29, 2021

(54) HIGH THROUGHPUT SECURE MULTI-PARTY COMPUTATION WITH IDENTIFIABLE ABORT

(71) Applicants: NEC Corporation of America, Herzlia (IL); Bar-Ilan University, Ramat-Gan (IL)

(72) Inventors: Jun Furukawa, Tel-Aviv (IL); Yehuda Lindell, Givat Shmuel (IL)

(73) Assignees: NEC Corporation Of America, Herzlia (IL); Bar-Iian University, Ramat-Gan (IL)

( * ) Notice: Subject to any disclaimer, the term of this patent is extended or adjusted under 35 U.S.C. 154(b) by 434 days.

(21) Appl. No.: 16/028,464

(22) Filed: Jul. 6, 2018

(65) Prior Publication Data

US 2020/0014703 A1    Jan. 9, 2020

(51) Int. Cl.
*H04L 29/06* (2006.01)
*H04L 9/06* (2006.01)
*H04W 12/06* (2021.01)

(52) U.S. Cl.
CPC .......... *H04L 63/123* (2013.01); *H04L 9/0656* (2013.01); *H04L 63/126* (2013.01);
(Continued)

(58) Field of Classification Search
CPC ... H04L 63/123; H04L 63/126; H04L 9/0656; H04L 2209/601; H04L 2209/46;
(Continued)

(56) References Cited

U.S. PATENT DOCUMENTS

| 5,764,767 A * | 6/1998 | Beimel ................... H04L 9/085 380/286 |
| 2004/0103276 A1* | 5/2004 | Jing ....................... H04L 9/0827 713/156 |

(Continued)

OTHER PUBLICATIONS

Araki et al. "High-Throughput Semi-Honest Secure Three-Party Computation With an Honest Majority", Proceedings of the 2016 ACM SIGSAC Conference on Computer and Communications Security, CCS '16, Vienna, Austria, Oct. 24-28, 2016, p. 805-817, Oct. 24, 2016.

(Continued)

*Primary Examiner* — Matthew Smithers
*Assistant Examiner* — Mirza Israr Javed

(57) ABSTRACT

A system for identifying one or more malicious parties participating in a secure multi-party computation (MPC), comprising one of a plurality of computing nodes communicating with the plurality of computing nodes through a network(s). The computing node is adapted for participating in an MPC with the plurality of computing nodes using secure protocol(s) established over the network(s), the secure protocol(s) support transmittal of private messages to each of the other computing nodes and transmittal of broadcast messages to all of the computing nodes, detecting invalid share value(s) of a plurality of share values computed and committed by the computing nodes during the MPC, verifying each of the share values according to a plurality of agreed share values valid for the MPC which are determined through a plurality of broadcast private messages, identifying identity of malicious computing node(s) which committed the invalid share value(s) failing the verification and outputting the identity.

11 Claims, 2 Drawing Sheets

Figure 1:
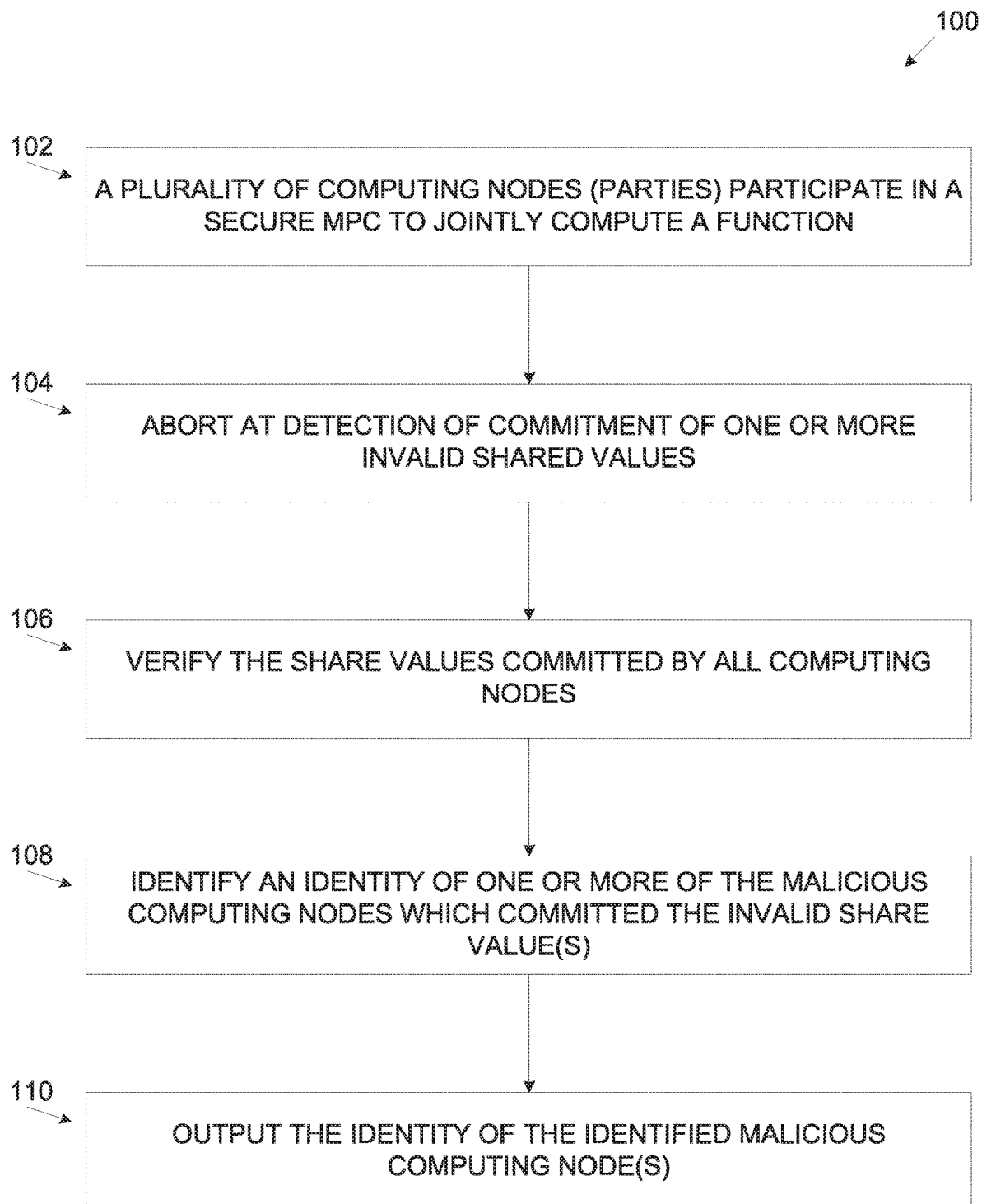

(52) U.S. Cl.
CPC ......... *H04W 12/06* (2013.01); *H04L 2209/46* (2013.01); *H04L 2209/601* (2013.01)

(58) Field of Classification Search
CPC ................. H04L 63/0428; H04L 9/085; H04L 2209/606; H04W 12/06
See application file for complete search history.

(56) References Cited

U.S. PATENT DOCUMENTS

| | | | | |
|---|---|---|---|---|
| 2012/0084368 | A1* | 4/2012 | Go | H04L 61/2575 709/206 |
| 2012/0233460 | A1* | 9/2012 | Kamara | H04L 9/3218 713/168 |
| 2015/0026347 | A1* | 1/2015 | Qian | G06F 9/505 709/226 |
| 2016/0335440 | A1* | 11/2016 | Clark | H04L 9/085 |
| 2020/0014703 | A1* | 1/2020 | Furukawa | H04L 9/085 |

OTHER PUBLICATIONS

Araki et al. "Optimized Honest-Majority MPC for Malicious Adversaries—Breaking the 1 Billion-Gate Per Second Barrier", Proceedings of the 38th IEEE Symposium on Security and Privacy, SP 2017, San Jose, CA, USA, May 22-24, 2017, 20 P., May 22, 2017.
Beaver et al. "Efficient Multiparty Protocols Using Circuit Randomization", Proceedings of the 11th Annual International Cryptology Conference on Advances in Cryptology, CRYPTO '91, Aug. 11-15, 1991, LNCS 576: 420-431, Aug. 11, 1991.
Bellare et al. "Efficient Garbling From a Fixed-Key Blockcipher", Proceedings of 2013 IEEE Symposium on Security and Privacy, SP 2013, Berkeley, CA, USA, May 19-22, 2013, p. 478-492, May 19, 2013.
Ben-Or et al. "Completeness Theorems for Non-Cryptographic Fault-Tolerant Distributed Computation", Proceedings of the 20th Annual ACM Symposium on Theory of Computing, STOC '88, Chicago, Ill. USA, May 2-4, 1988, p. 1-10, May 2, 1988.
Bogdanov et al. "High-Performance Secure Multi-Party Computation for Data Mining Applications", International Journal of Information Security Archive, 11(6): 403-418, Nov. 2012.
Bogdanov et al. "Sharemind: A Framework for Fast Privacy-Preserving Computations", Proceedings of the 13th European Symposium on Research in Computer Security: Computer Security, ESORICS '08, Malaga, Spain, Oct. 6-8, 2008, p. 192-206, Oct. 6, 2008.
Canetti "A Simpler Variant of Universally Composable Security for Standard Multiparty Computation", Annual Cryptology Conference, CRYPTO 2015, LNCS 9216: 3-22, Published Online Aug. 1, 2015.
Canetti "Universally Composable Security: A New Paradigm for Cryptographic Protocols", Proceedings of the 42nd IEEE Symposium on Foundations of Computer Science, FOCS '01, Oct. 14-17, 2001, Las Vegas, Nevada, USA, p. 136-145, Oct. 14, 2001.
Chaum et al. "Multiparty Unconditionally Secure Protocols", Proceedings of the 20th Annual ACM Symposium on Theory of Computing, STOC '88, Chicago, Illinois, USA, May 2-4, 1988, p. 11-19, May 2, 1988.
Cleve "Limits on the Security of Coin Flips When Half the Processors Are Faulty", Proceedings of the 18th Annual ACM Symposium on Theory of Computing, STOC '86, Berkeley, CA, USA, May 28-30, 1986, p. 364-369, May 28, 1986.
Cohen et al. "Fairness Versus Guaranteed Output Delivery in Secure Multiparty Computation", Proceedings of the 28th International Conference on the Theory and Applicaiton of Cryptology and Information Scurity, ASIACRYPT 2014: Advances in Cryptology, Kaoshiung, Taiwan, R.O.C., Dec. 7-11, 2014, LNCS, Part II(8874): 466-485, Aug. 26, 2014.
Cramer et al. "Share Conversion, Pseudorandom Secret-Sharing and Applicaitons to Secure Distributed Computing", Proceedings of the 2nd International Conference on Theory of Cryptography, TCC '05, Cambridge, MA, USA, Feb. 10-12, 2005, p. 342-362, Feb. 10, 2005.
Damgard et al. "From Passive to Covert Security at Low Cost", Proceedings of the 7th International Conference on Theory of Cryptography, TCC '10, Zurich, Switzerland, Feb. 9-11, 2010, p. 128-145, Feb. 9, 2010.
Damgard et al. "Multiparty Computation From Somewhat Homomorphic Encryption", Proceedings of the 32nd Annual Cryptology Conference on Advances in Cryptology, CRYPTO 2012, Santa Barbara, CA, USA, Aug. 19-23, 2012, LNCS, 7417: 643-662 , Aug. 19, 2012.
Damgard et al. "Practical Covertly Secure MPC for Dishonest Majority—or: Breaking the SPDZ Limits", 18th European Symposium on Research in Computer Security, ESORICS 2013, LNCS, 8134: 1-18, Sep. 9, 2013.
Furukawa et al. "High-Throughput Secure Three-Party Computation for Malicious Adversaries and an Honest Majority", Annual International Conference on the Theory and Applications of Cryptographic Techniques, Paris, France, Apr. 30-May 4, 2017, EUROCRYPT 2017, Advances in Cryptology, LNCS, Part II(10211): 225-255, Apr. 30, 2017.
Giacomelli et al. "ZKBoo: Faster Zero-Knowledge for Boolan Circuits", Proceedings of the 25th USENIX Security Sympsoium, Austin, TX, USA, Aug. 10-12, 2016, p. 1069-1083, Aug. 10, 2016.
Goldreich et al. "How to Play Any Mental Game or a Completeness Theorem for Protocols With Honest Majority", Proceedings of the 19th Annual ACM Sympsoium on Theory of Computing, STOC '87, p. 218-229, Jan. 1987.
Huang et al. "Faster Secure Two-Party Computation Using Garbled Cicuits", Proceedings of the 20th USENIX Conference on Security, San Francisco, CA, USA, Aug. 8-12, 2011, 16 P., Aug. 8, 2011.
Ishai et al. "Extending Oblivious Transfers Efficiently", Proceedings of the 23rd Annual International Cryptology Conference, CRYPTO 2003, Santa Barbara, CA, USA, Aug. 17-21, 2003, Advances in Cryptology, LNCS, 2729: 145-161, Aug. 17, 2003.
Keller et al. "An Architecture for Practical Actively Secure MPC With Dishonest Majority", Proceedings of the 2013 ACM SIGSAC Conference on Computer & Communications Security, CCS '13, Berlin, Germany, Nov. 4-8, 2013, p. 549-560, Nov. 4, 2013.
Keller et al. "MASCOT: Faster Malicious Arithmetic Secure Computation With Oblivious Transfer", Proceedings of the 2016 ACM SIGSAC Conference on Computer and Communications Security, CCS '16, Vienna, Austria, Oct. 24-28, 2016, p. 830-842, Oct. 24, 2016.
Keller et al. "Reducing Communication Channels in MPC", JACR Cryptology ePrint Archive, Report 2017(492): 1-42, Jun. 1, 2017.
Kolesnikov et al. "Improved Garbled Circuit: Free XOR Gates and Applications", ICALP '08 Proceedings of the 35th International Colloquium on Automata, Languages and Programming, Reykjavik, Iceland, Jul. 7-11, 2008, Part II: 486-498, Jul. 7, 2008.
Kreuter et al. "Billion-Gate Scure Computation With Malicious Adversaries", Proceedings of the 21st USENIX Conference on Security Symposium, Security '12, Bellevue, Washington, USA, Aug. 8-10, 2012, 12: 285-300, Aug. 8, 2012.
Kushilevitz et al. "Information-Theoretically Secure Protocols and Security Under Composition", SIAM Journal on Computing, 39(5): 2090-2112, Mar. 5, 2010.
Larraia et al. "Dishonest Majority Multi-Party Computation for Binary Circuits", Proceedings of the 34th Annual Cryptology Conference, CRYPTO 2014, Santa Barbara, CA, USA, Aug. 17-21, 2014, Advances in Crytology, LNCS, Part II(8617): 495-512, Aug. 17, 2014.
Laud et al. "Verifiable Computation in Multiparty Protocols With Honest Majority", Proceedings of the 8th International Conference on Provable Security, ProvSec 2014, Hong Kong, China, Oct. 9-10, 2014, LNCS, 8782: 146-161, Oct. 9, 2014.
Lindell "General Composition and Universal Composability in Secure Multi-Party Computation", Proceedings of the 44th Annual IEEE Symposium on Foundations of Computer Science, FOCS '03, Cambridge, MA, USA, Oct. 11-14, 2003, p. 394-403, Oct. 11, 2003.
Rabin et al. "Verifiable Secret Sharing and Multiparty Protocols With Honest Majority", Proceedings of the 21st Annual ACM

(56) References Cited

OTHER PUBLICATIONS

Symposium on Theory of Computing, STOC '89, Seattle, Washington, USA, May 14-17, 1989, p. 73-85, May 14, 1989.

Rindal et al. "Faster Malicious 2-Party Secure Computation With Online/Offline Dual Execution", USENIX Security Symposium, p. 297-314, Aug. 10, 2016.

Talviste "Applying Secure Multi-Party Computation in Practice", Dissertation Accepted for the Commencement of the Degree of Doctor of Philosophy, Institute of Computer Science, Faculty of Mathematics and Computer Science, University of Tartu, Estonia, p. 1-143, Feb. 3, 2016.

Yao "How to Generate and Exchange Secrets", Proceedings of the 27th Annual Symposium on Foundations of Computer Science, SFCS '86, Toronto, Canada, Oct. 27-29, 1989, p. 162-167, Oct. 27, 1989.

Zahur et al. "Two Halves Make a Whole: Reducing Data Transfer in Garbled Circuits Using Half Gates", Proceedings of the 34th Annual International Conference on the Theory and Applications of Cryptographic Techniques, EUROCRYPT 2015, Sofia, Bulgaria, Apr. 26-30, 2015, LNCS, Part II(9057): 220-250, Apr. 26, 2015.

\* cited by examiner

US 11,050,762 B2

HIGH THROUGHPUT SECURE MULTI-PARTY COMPUTATION WITH IDENTIFIABLE ABORT

REFERENCED DOCUMENTS

"Optimized Honest-Majority MPC for Malicious—Adversaries Breaking the 1 Billion-Gate per Second Barrier" by T. Araki, A. Barak, J. Furukawa, T. Lichter, Y. Lindell, A. Nof, K. Ohara, and A. Watzman, in IEEE Symposium on Security and Privacy, SP 2017, San Jose, Calif., USA, May 22-24, 2017, IEEE Computer Society, 2017, the contents of which are incorporated herein by reference in their entirety.

"From Passive to Covert Security at Low Cost" by I. Damgard, M. Geisler, and J. B. Nielsen, in D. Micciancio, editor, Theory of Cryptography, 7th Theory of Cryptography Conference, TCC 2010, Zurich, Switzerland, Feb. 9-11, 2010, proceedings, volume 5978 of Lecture Notes in Computer Science, pages 128-145, Springer, 2010, the contents of which are incorporated herein by reference in their entirety.

"Verifiable Computation in Multiparty Protocols with Honest Majority" by P. Laud and A. Pankova, in S. S. M. Chow, J. K. Liu, L. C. K. Hui, and S. Yiu, editors, Provable Security—8th International Conference, ProvSec 2014, Hong Kong, China, Oct. 9-10, 2014, proceedings, volume 8782 of Lecture Notes in Computer Science, pages 146-161, Springer, 2014, the contents of which are incorporated herein by reference in their entirety.

"High-Throughput Secure Three-Party Computation for Malicious Adversaries and an Honest Majority" by J. Furukawa, Y. Lindell, A. Nof, and O. Weinstein, in J. Coron and J. B. Nielsen, editors, Advances in Cryptology—EUROCRYPT 2017-36th Annual International Conference on the Theory and Applications of Cryptographic Techniques, Paris, France, Apr. 30-May 4, 2017, Proceedings, Part II, volume 10211 of Lecture Notes in Computer Science, pages 225-255, 2017, the contents of which are incorporated herein by reference in their entirety.

FIELD AND BACKGROUND OF THE INVENTION

The present invention, in some embodiments thereof, relates to identifying malicious (adversary) computing nodes (parties) participating in a secure Multi-Party Computation (MPC) and, more particularly, but not exclusively, to identifying malicious computing nodes participating in the secure MPC by validating each shared value computed and committed by each of the computing nodes.

Computations involving multiple parties (MPC) which jointly compute a function may be of major significance for a plurality of practical applications ranging from simple tasks such as, for example, coin tossing to more complex tasks such as, for example, electronic auctions, E-commerce (on-line commerce), electronic voting, privacy-preserving data mining and/or the like.

Due to one or more reasons, for example, privacy, security and/or the like, in many of the MPC applications, the parties participating in the joint computation are reluctant to share their own data with the other parties. A secure MPC utilizing a cryptography based secure protocol as known in the art may therefore provide a framework for such MPC applications. Moreover, in addition to assuring privacy, the secure MPC as known in the art may ensure immunity to malicious parties, independence of input data among the parties, fairness in distributing the output of the jointly computed function to all parties, guaranteed output and/or the like.

SUMMARY OF THE INVENTION

According to a first aspect of the present invention there is provided a system for identifying one or more malicious parties participating in a secure multi-party computation (MPC), comprising one or more of a plurality of computing nodes communicating with the plurality of computing nodes through one or more networks, wherein the one or more computing nodes comprising one or more processors adapted to execute a code. The code comprising:

Code instructions to participate in an MPC with the plurality of computing nodes using one or more secure protocols established over the one or more networks. The secure protocol(s) supporting transmittal of private messages to each of the plurality of computing nodes and transmittal of broadcast messages to all the plurality of computing nodes.

Code instructions to detect one or more invalid share values of a plurality of share values computed and committed by the plurality of computing nodes during the MPC.

Code instructions to verify each of the plurality of share values according to a plurality of agreed share values determined through a plurality of broadcast messages and private messages. The plurality of agreed share values is valid for the MPC.

Code instructions to identify an identity one or more malicious computing nodes of the computing nodes which committed the one or more invalid share values failing the verification.

Code instructions to output the identity.

According to a second aspect of the present invention there is provided a computer implemented method of identifying one or more malicious parties participating in a secure multi-party computation (MPC), comprising using one or more processors of one or more of a plurality of computing nodes communicating with the plurality of computing nodes through one or more networks. The one or more processors are adapted to execute a code for:

Participating in an MPC with the plurality of computing nodes using one or more secure protocol established over the one or more networks. The secure protocol(s) supporting transmittal of private messages to each of the plurality of computing nodes and transmittal of broadcast messages to all the plurality of computing nodes.

Detecting one or more invalid share values of a plurality of share values computed and committed by the plurality of computing nodes during the MPC.

Verifying each of the plurality of share values according to a plurality of agreed share values determined through a plurality of the broadcast messages and the private messages. The plurality of agreed share values is valid for the MPC.

Identifying an identity one or more malicious computing nodes of the computing nodes which committed the one or more invalid share values failing the verification.

Outputting the identity.

Identifying and exposing the identity of the malicious computing node(s) and hence hurting the adversary and his reputation may naturally deter potential adversaries from corrupting the secure MPC. Moreover, since the secure MPC protocol with identifiable abort ensures data privacy and correctness (i.e. aborts when the adversary is detected), the adversary may gain nothing by cheating while risking exposure and/or reputation damage. Moreover while supporting identifying the malicious computing node(S), the high throughput of the secure MPC protocol is maintained since the identification process may be conducted after detection of the invalid share value(s). As such during runtime (until detection of the malicious computing node(s)) the MPC protocol executes as standard MPC protocols.

In a further implementation form of the first and/or second aspects, the one or more malicious computing nodes constitute a minority among the plurality of computing nodes. In order to identify the malicious computing node(s) the honest computing nodes must constitute a majority of the computing nodes. In case this condition is not met, the honest malicious nodes may not be able to accumulate sufficient reliable data, specifically agreed share values to reconstruct the MPC protocol and identify the malicious computing node(s).

In a further implementation form of the first and/or second aspects, one or more of the plurality of agreed share values is determined based on a data exchanged between the plurality of computing nodes transmitting the plurality of broadcast messages and private messages after the detection. The plurality of computing nodes may exchange data with each other, in particular after detecting the malicious computing node(s) to allow the other computing nodes to access the committed share values. Accessing the committed share values, the honest computing nodes may agree on the agreed share values which are committed by the honest computing nodes.

In a further implementation form of the first and/or second aspects, one or more of the plurality of agreed share values is determined based on a data exchanged between the plurality of computing nodes transmitting the plurality of broadcast messages and private messages prior to the detection. The plurality of computing nodes may store message history of messages exchanged between the computing nodes during the MPC prior to the detection of the malicious computing node(s). Using the history of messages the honest computing nodes may agree on the agreed share values which were committed by the honest computing nodes during the MPC session, in particular before detecting the malicious computing node(s).

In a further implementation form of the first and/or second aspects, the identification is based on a reconstruction of the one or more secure protocols from the plurality of agreed share values to identify, for each of the plurality of share values, an originating computing node which committed the each of share values. Since the invalid share value(s) is not agreed on as an agreed share value, using the agreed share values, the honest computing nodes may reconstruct the secure protocol to identify the originating malicious computing node(s) which committed the invalid share value(s).

In a further implementation form of the first and/or second aspects, the reconstruction is done based on data exchanged between the plurality of computing nodes transmitting the plurality of broadcast messages and private messages. The plurality of computing nodes may transmit private messages which are typically encrypted to another computing node to provide the other computing node the access key (opening) to the broadcasted commitment messages comprising the committed share values.

In an optional implementation form of the first and/or second aspects, a plurality of instances of the secure protocol(s) is executed concurrently. Executing the plurality of instances of the protocol may significantly increase the throughput of data exchanged between the computing nodes.

In a further implementation form of the first and/or second aspects, each of the plurality of broadcast messages is encoded for authentication of an originating computing node of the each broadcast message. This may allow each of the plurality of computing nodes to verify the identity of the originating computing node which transmitted a certain broadcast message.

In a further implementation form of the first and/or second aspects, each of the plurality of private messages is encrypted for authentication of the each private message, wherein the authentication comprising authentication of a content of the each private message and authentication of an originating computing node of the each private message. This may allow each computing node to verify the identity of the originating computing node from which a certain private message is received. The encryption may further allow only the intended recipient (having an appropriate encryption key) to access the content of the message.

In a further implementation form of the first and/or second aspects, one or more of the plurality of private messages is encrypted using a random process applying one or more seeds committed by one or more pseudorandom function. Using the random processes based on the seeds which are also selected randomly may significantly increase robustness of the encryption of the messages, specifically the private messages.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
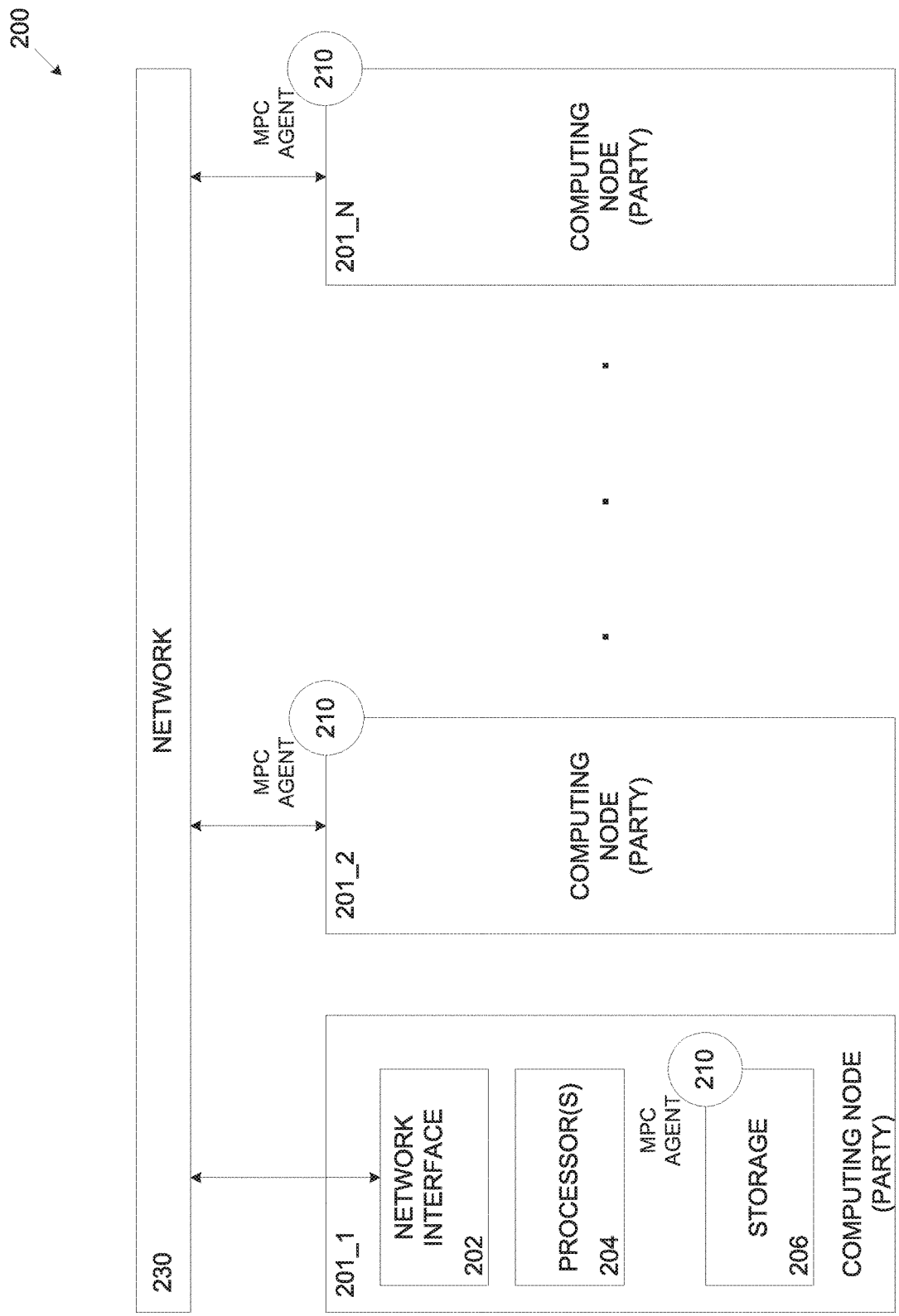

In the drawings:

FIG. 1 is a flowchart of an exemplary process of identifying malicious party(s) participating in a secure MPC, according to some embodiments of the present invention; and FIG. 2 is a schematic illustration of an exemplary system for identifying malicious party(s) participating in a secure MPC, according to some embodiments of the present invention.

DESCRIPTION OF SPECIFIC EMBODIMENTS OF THE INVENTION

The present invention, in some embodiments thereof, relates to identifying malicious (adversary) computing nodes (parties) participating in a secure MPC and, more particularly, but not exclusively, to identifying malicious computing nodes participating in a secure MPC by validating each shared value computed and committed by each of the computing nodes.

The secure MPC is conducted by a plurality of computing nodes (parties), for example, a server, a computer, a processing device, a cluster of computing nodes and/or any computing device comprising one or more processors to jointly compute a function over their respective input data without exposing their private input data to the other computing nodes. The secure MPC may be applicable for a plurality of practical applications ranging from simple tasks such as, for example, coin tossing and/or the like to highly complex tasks such as, for example, electronic auctions, E-commerce, electronic voting, privacy-preserving data mining and/or the like.

The computing nodes participating in the secure MPC may exchange data among them using one or more secure MPC protocols which are cryptography based secure protocols allowing data sharing between the computing nodes while ensuring data privacy. While executing the secure MPC protocol(s), the computing nodes may transmit encrypted private messages with each other and broadcast authenticated messages to all of the other computing nodes. Data privacy in the secure MPC context means that none of the computing nodes may infer any information about the input data held by the other computing nodes from the messages exchanged during the execution of the secure MPC protocol.

The only information that may be inferred by each of the computing nodes about the (private) input data of the other computing nodes is therefore whatever may be inferred only from the output of the jointly computed function. The secure MPC protocols.

While ideally the computing nodes participating in the MPC are honest (honest parties), in reality an adversary may corrupt one or more of the computing nodes such that one or more malicious computing node(s) may also participate in the secure MPC. The malicious computing node(s), i.e. malicious party(s), may also be referred to as dishonest party(s), cheating party(s), corrupted party(s) and/or cheater(s) herein after. Such malicious computing nodes may deviate from the secure MPC protocol in an attempt to corrupt the protocol, for example, obtain the private input data of one or more of the honest computing nodes, affect the output of the one or more of the honest computing nodes, affect the output of the jointly computed function and/or the like.

Assuming the honest computing nodes constitute a majority among the computing nodes participating in the MPC, one or more secure MPC protocols with abort as known in the art, for example, as described in referenced documents [1], [2], [3] and [4]), may ensure correctness of the protocol and guarantee an output delivery while maintaining the data privacy. Where ensuring the correctness means that the secure MPC protocol prevents the malicious computing node(s) from forcing any of the honest computing nodes to output incorrect data. Guarantying the output delivery means that the secure MPC protocol may guarantee that the correct output data of honest computing nodes is provided to the other computing nodes.

The secure MPC protocol(s) with abort may guarantee the correctness and the output delivery by detecting errors, i.e. invalid share values committed by one or more of the computing nodes during the MPC cycles and forcing the participating computing nodes to abort the MPC and hence maintain their data privacy. However, while able to detect the error(s), the secure MPC protocols with abort may be unable to identify the computing node(s) which committed the invalid share values which may typically be malicious computing node(s).

According to some embodiments of the present invention, there is provided methods, systems and computer program products for identifying an identity of one or more malicious computing nodes participating in the secure MPC by applying a secure MPC protocol with identifiable abort. The secure MPC protocol with identifiable abort which is based on secret sharing algorithms maintains the high throughput, the data privacy and output delivery guarantee as the secure MPC protocols with abort while further allowing identification of the identity of the malicious party(s) which committed the invalid share value(s).

The secure MPC protocols with identifiable abort further ensures independence of inputs as well as fairness where the independence of inputs means that none of the computing nodes may depend its input data on input data of other computing nodes and fairness means that the result of the jointly computed function is outputted only if all the computing nodes. Since fairness coupled with identifiable abort may guarantee the output delivery, the secure MPC protocol with identifiable abort thus provides full security.

Identifying the identity of the malicious computing node(s) is done following the abort event, i.e. following detection of one or more messages comprising the invalid share value(s). Identifying the identity of the malicious computing node(s) may be done by verifying each of the share values committed by all of the computing nodes. The computing nodes, specifically the honest computing nodes may verify all the share values committed by all of the computing nodes according to (against) "agreed share values" which are determined as valid share values for the secure MPC.

The honest computing nodes communicating amongst themselves using the private and broadcast messages may apply one or more algorithms to determine and/or identify the agreed share values. In order to agree on the agreed share values, an honest computing node may send to another honest computing node a commitment message comprising a part of its share value that is to be agreed and an opening value which may be used by the other honest computing node to open (decrypt) the commitment message. This sending honest computing node may also broadcast the same commitment message. The receiving honest computing node may verify if the received opening value is the valid opening value of the broadcasted commitment message. If the opening value is valid, the part of share value(s) transmitted by the sending honest computing is agreed.

If the opening value is not valid, the receiving honest computing node may broadcasts a complaint for the received opening value. In response to the broadcasted complaint, the sending honest computing node may broadcast an opening value for the broadcasted commitment message. If the broadcasted opening value is a valid opening of the broadcasted commitment message, the part of share value(s) transmitted by the sending honest computing is agreed. If the broadcasted opening value is not a valid opening value of the broadcasted commitment message, the sending honest computing is identified as the malicious computing node (cheater).

Once the agreed share values are set, each of the honest computing nodes may reconstruct the secure protocol from the agreed share values to the abort point in order to identify the originating computing node of each share value.

Therefore, by analyzing the commitment messages, one or more of the honest computing nodes may identify one or more invalid commitment messages which failed the verification, i.e. the invalid commitment message(s) is incompliant with the agreed share values. According to the reconstruction of the protocol, one or more of the honest computing nodes may trace each of the commitment messages, specifically each of the invalid commitment message(s) to its originating computing node(s) and thus identify the identity of the malicious computing node(s) which sent each invalid commitment message(s). Optionally, one or more of the honest computing nodes reconstructs the protocol based on the message history.

After identifying the malicious party(s), the honest computing node(s) may output, for example, distributed, published and/or the like the identity of the identified malicious party(s) to publicize this identity(s) in order to expose the malicious computing node(s) and/or the adversary(s).

The secure MPC protocol with identifiable abort may present significant advantages compared to existing secure MPC protocols, in particular, secure MPC protocols which abort at detection of the malicious party(s) as the secure MPC protocol with identifiable abort allows identifying the identity of the malicious computing node(s) while maintaining extremely high throughput which may be essential for an efficient secure MPC. Identifying and exposing the identity of the malicious computing node(s) and hence hurting the adversary and his reputation may naturally deter potential adversaries from corrupting the secure MPC. Moreover, since the secure MPC protocol with identifiable abort ensures data privacy and correctness (i.e. aborts when the adversary is detected), the adversary may gain nothing by cheating while risking exposure and/or reputation damage.

Some of the existing secure MPC protocols which achieve high throughput may only be secure in the presence of semi-honest malicious parties. Other protocols may achieve high throughput while failing to guarantee fairness as well as unable to identify the malicious party(s) such that the adversary may cause the parties to abort and not receive an output (even in cases where the adversary received the output) and the parties may not identify the malicious party(s).

Some of the secure MPC protocols supporting identification of the malicious party(s) for semi-honest malicious parties may be modified to achieve identifiable abort in which the malicious parties may be identified.

Such modifications may include, for example, a nave approach, in which each of the computing nodes may sign its respective committed share values. By analyzing the share values and their assigned signatures, the signature of the detected invalid share value(s) may be indicative of the malicious computing node(s) which committed the invalid share value(s). However, such approach may be highly demanding as it may require the parties to invest significantly high resources to encode, decode and communicate the signatures for each committed share value in run time during the commitment operation, thus add significant overhead to the computation which may negatively impact the throughput.

The secure MPC protocol with identifiable abort on the other hand maintains the high throughput of the secure MPC protocol with abort as known in the art since the verification of the shared values is done only after aborting the secure MPC, i.e. after detecting the invalid shared values(s). The verification process may therefore be regarded as an offline process which is conducted after the joint computation of the function is aborted. As such the online performance, specifically the throughput of the secure MPC protocol with identifiable abort is maintained during the computation phase of the secure MPC.

Moreover, the secure MPC protocol with identifiable abort may preserve the secure MPC properties as the secure MPC protocol with abort, specifically, data privacy, independence of input, correctness and guaranteed output delivery. In some scenarios the fairness may be somewhat compromised as the verification process also needs to be robust.

Furthermore, the secure MPC protocol with identifiable abort may execute and ensure security under the concurrent general composition such that multiple secure MPC protocols with identifiable abort may be concurrently established between the computing nodes thus significantly increasing data exchange throughput and/or decreasing transmission latency between the computing nodes. While some of the existing secure MPC protocols may support some operations in the concurrent general composition these secure MPC protocols may not allow some other operations to execute under the concurrent execution of multiple such secure MPC protocols.

The secure MPC with identifiable abort on the other hand may support most if not all operations to execute under the concurrent execution.

In addition, some of the existing secure MPC protocols may fail the asynchronous nature of the concurrent general composition as the adversary may block messages exchanged between the honest parties. In contrast, the secure MPC with identifiable abort may be executed in a concurrent general composition even when the network is asynchronous by preventing the adversary from blocking messages exchanged between the honest parties. While the malicious parties may still delay their own messages, this may have little and typically no impact on the overall performance and/or throughput of the secure MPC protocol with identifiable abort.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of identifying malicious computing node(s) participating in a secure MPC, according to some embodiments of the present invention. An exemplary process 100 may be executed by each of a plurality of computing nodes (parties), for example, a computer, a server, a cluster of computing nodes and/or any computing device having one or more processors participating in a secure MPC for jointly computing a function over their respective private input data. The computing nodes may exchange data between one another using a secure MPC protocol with identifiable abort to identify the identity one or more malicious computing nodes (also referred as malicious, dishonest, cheating and/or corrupted parties) which may participate in the secure MPC.

The secure MPC protocol with identifiable abort may be applicable for secure MPC sessions in which honest computing nodes constitute a majority among the computing nodes participating in the secure MPC, i.e. the malicious computing node(s) constitutes a minority among the computing nodes participating in the secure MPC. Moreover, the secure MPC may be executed under concurrent general composition in which multiple instances of the secure MPC protocols may be executed concurrently thus significantly increasing the data throughput between the computing nodes and/or reducing latency in data transfer between the computing nodes.

Identifying the malicious party(s) may be done by verifying each of a plurality of share values committed by the computing nodes after detecting one or more errors, i.e. invalid commitment messages for committing invalid share value(s). Verifying the plurality of committed share values is done only after abort, i.e. after detecting the presence of the malicious party(s) in the secure MPC.

The computing nodes, specifically the honest computing nodes may exchange private and broadcast messages to determine and/or identify valid agreed share values committed by the honest parties and reconstruct the secure MPC protocol from the agreed share values to the point of abort, i.e. to the point of detection of the malicious computing node(s). The agreed share values may be further determined based on message history comprising a plurality of messages exchanged between the computing nodes during one or more cycles of the secure MPC session.

The agreed share values may also be identified by comparing the committed share values to pre-computed values allowed for the secure MPC. Committed share values which failed the verification, i.e. incompliant with the agreed share values may be considered invalid and the identity of the malicious party(s) which committed these invalid share value(s) may be identified.

Once identified, the identity of the identity of the identified malicious party(s) may be outputted, for example, distributed, published and/or the like to publicize the identity of the malicious party(s).

Reference is also made to FIG. 2, which is a schematic illustration of an exemplary system for identifying malicious computing node(s) participating in a secure MPC, according to some embodiments of the present invention. An exemplary system 200 comprises a plurality of computing nodes 201, for example, computing nodes 201_1, 201_2 through 201_N participating in the secure MPC each executing a process such as the process 100 to execute (follow) the secure MPC protocol with identifiable abort in order to identify the identity of one or more malicious parties participating in the secure MPC.

Each of the computing nodes 201, for example, a computer, a server, a cluster of computing nodes and/or any computing device having one or more processors may typically include a network interface 202, a processor(s) 204 and a storage 206. The processor(s) 204 is coupled to the network interface 202 and to the storage 206 through one or more interconnecting interfaces, for example, a bus, a communication interface, a switch fabric and/or the like.

The network interface 202 may provide one or more network interfaces, for connecting to the other computing nodes 201 over a network 230 comprising one or more networks, for example, a Local Area Network (LAN), a wide Area Network (WAN), a Wireless LAN (WLAN) (e.g. Wi-Fi), a cellular network and/or the like. The network 230 may support private channels over which each of the computing nodes 201 may exchange secure authenticated private messages with each of the other computing nodes 201. The network 230 further supports broadcast channels over which each of the computing nodes 201 may broadcast authenticated messages to all of the other computing nodes 201. Naturally, each private message may be encrypted to be decoded only by its respective destination computing nodes 201 while each broadcast message may be decoded by all of the computing nodes 201. Both the private messages and the broadcast messages may typically be authenticated such that the originating computing node 201 of each of the messages may be identified.

The processor(s) 204, homogenous or heterogeneous, may be arranged for parallel processing, as clusters and/or as one or more multi core processor(s).

The storage 206 may include one or more computer readable medium devices, either persistent storage and/or volatile memory for one or more purposes, for example, storing program code, storing data, storing intermediate computation products and/or the like. The persistent storage may include one or more persistent memory devices, for example, a Flash array, a Solid State Disk (SSD) and/or the like for storing program code. The volatile memory may also include one or more volatile memory devices, for example, a Random Access Memory (RAM) device. The storage 206 may further include one or more networked storage resources, for example, a storage server, a Network Attached Storage (NAS) and/or the like accessible through the network interface 202.

The processor(s) 204 may execute one or more one or more software modules, for example, a process, an application, an agent, a utility, a script, a plug-in and/or the like. Wherein a software module may comprises a plurality of program instructions stored in a non-transitory medium such as the storage 206 and executed by a processor such as the processor(s) 204.

The processor(s) 204 may execute, for example, an MPC agent 210 for participating in the secure MPC using one or more secure MPC protocols with identifiable abort. Optionally, one or more of the MPC agents 210 are executed by one or more virtual machines (VM) hosted by one or more of the computing nodes 201. Optionally, one or more of the MPC agents 210 are executed by one or more remote platforms, for example, a remote server, a cloud computing platform, such as, for example, Amazon Web Service (AWS), Google Cloud, Microsoft Azure and/or the like. In such cases, the processor(s) 204 of computing node(s) 201 may locally execute one or more local software modules, for example, a local agent, a web browser and/or the like to communicate with the remote platform(s) executing the MPC agent(s) 210.

The computing nodes 201 participating in the secure MPC may be considered and/or referred to herein after as parties in the secure MPC. More specifically, each party consists of a computing node 201 executing its respective MPC agent 210. However, for brevity, a party, i.e. a computing node 201 executing its respective MPC agent 210 may be referred to herein after only as the MPC agent 210.

The computing nodes 201 may include a majority of honest computing nodes which follow the rules of the secure MPC protocol and one or more malicious computing nodes (also referred as dishonest, cheating and/or corrupted parties) which may deviate (cheat) from the secure MPC protocol in an attempt to corrupt the protocol, for example, to obtain the input data of one or more of the honest parties, affect the output of the one or more of the honest parties, affect the output of the jointly computed function and/or the like.

Assuming a majority of honest computing nodes among the computing nodes 201, the secure MPC protocol(s) with identifiable abort enables the computing nodes 201 each having private input data to compute a joint function over their respective input data in the presence of adversarial behavior, i.e. in the presence of one or more of the malicious computing nodes. The secure MPC protocol guarantees several aspects of the secure MPC:

Data privacy, meaning that none of the MPC agents 210 may infer any information about the input data held by the other MPC agents 210 from the messages exchanged during the execution of the secure MPC protocol(s).

Correctness, meaning that the secure MPC protocol prevents the malicious party(s) from forcing any of the honest parties to output incorrect data.

Independence of inputs, meaning that none of the MPC agents 210 may depend its input data on input data of other MPC agents 210.

Fairness, meaning that the output of each of the MPC agents 210 is outputted only if the Guaranteed output delivery meaning that the result of the jointly computed function is outputted only if all the MPC agents 210 are guaranteed to receive this result.

In the case of no honest majority, there exist some joint functions, for example, the XOR function, unbiased coin tossing and/or the like which may not be securely computed with fairness or guaranteed output delivery using the secure MPC protocol. Thus, in such cases, security with abort is defined, where privacy, correctness and independence of inputs are required, but not fairness or guaranteed output delivery. Such exemplary secure MPC protocols with abort include, among others, the secure MPC protocols described in the referenced documents [1], [2], [3] and/or [4].

Feasibility and efficiency of the secure MPC protocols is known in the art. It was demonstrated that under appropriate hardness assumptions, any probabilistic polynomial-time functionality may be securely computed with computational security with or without a majority of honest computing nodes where security with abort is achieved for the case of no honest majority. In addition, when less than a third of the MPC agents 210 are corrupted, any functionality may be securely computed with information-theoretic security assuming ideal communication channels supported by the network 230.

When assuming a broadcast channel, information-theoretic security may be achieved for any honest majority. These fundamental feasibility results exhibited the extraordinary power of secure MPC and laid the foundation for the secure MPC potential to enable shared utilization of data while preserving data privacy for each of the MPC agents 210. Efficiency of the secure MPC is also demonstrated in the art, for example, in the referenced documents [1] and [4] among other publications and may therefore be used in practice to solve many non-trivial problems.

The concretely efficient secure MPC protocols as known in the art may be divided into protocols that aim to achieve low latency and protocols that aim to achieve high throughput. Where low latency related to minimizing the time from the beginning to the end of a single computation and high throughput relates to maximizing the number of function computations per second. These different goals may be suitable for different applications, and may thus be of major interest. Protocols targeting low latency may typically have a constant number of cycles and may be based on garbled circuits. In contrast, protocols targeting high throughput may have low communication per gate and may be based on secret sharing.

The specific case of three parties (i.e. MPC agents 210) with a majority of honest parties may be of considerable interest in the context of high throughput secure computation. This case may be well suited to the client-server "MPC service" model, where clients (parties) share their inputs to the three servers who carry out the secure computation for them.

The secure MPC protocol with identifiable abort may use some functionality which is implemented by one or more existing secure MPC protocol with abort as known in the art, specifically for identifying the malicious party(s). However the MPC protocol with identifiable abort is modified to include provisions to allow the identification of the malicious party(s) once detected. However, the secure MPC protocol with identifiable abort includes additional functionality compared to the existing secure MPC protocol with abort to support the identification of the malicious party(s) based on verification of the share values computed and committed by the MPC agents 210.

Identification of the malicious MPC agent(s) may depend on the fact that the secure MPC protocol is computationally secure since achieving absolute information theoretical security may not be feasible and/or practical due to the extremely high resources, for example, processing power, computations time, network bandwidth, latency and/or the like. As known in the art, such straight-line computational security which may be simulated in the stand-alone setting may not imply security under concurrent general composition, the security model of the secure MPC protocol with identifiable abort under concurrent general composition is first proved. The security of the secure MPC protocol with identifiable abort is maintained with complete fairness and identifiable abort.

Moreover, the security model of the secure MPC protocol with identifiable abort under the concurrent general composition ensures the security even when the network 230 is asynchronous and the malicious computing node(s) (adversary) is only allowed to delay the delivery of messages, i.e. the security model may prevent the adversary(s) from blocking messages exchanged between the honest parties while allowing the adversary(s) to delay its own messages. The secure MPC protocol with identifiable abort may require such an asynchronous network 230 to achieve complete fairness and identifiable abort.

Under the concurrent general composition, the MPC agents 210 may participate in an MPC using a general arbitrary secure MPC protocol $\phi$ that concurrently executes multiple instances of such a secure MPC protocol $\pi$ which computes an ideal reactive functionality $\mathcal{F}$. In order to define the security, a real execution of the secure MPC protocol $\phi$ with the secure MPC protocol $\pi$ is compared to an idealized setting where the secure MPC protocol $\phi$ is executed, but the MPC agents 210 access the ideal reactive functionality $\mathcal{F}$ instead of executing the secure MPC protocol $\pi$. Such an execution may be referred to as a hybrid model, because the ideal functionality $\mathcal{F}$ is within the model, but the secure MPC protocol $\phi$ also communicates real messages.

The security requirement is that, for every real adversary $\mathcal{A}$ and every arbitrary secure MPC protocol $\phi$, there exists an ideal adversary $\mathcal{S}$ such that for every set of inputs $\chi$ to the secure MPC protocol $\phi$ and an auxiliary input z to the real adversary $\mathcal{A}$, the output of the ideal adversary $\mathcal{S}$ and the honest parties in the hybrid execution of the secure MPC protocol $\phi$ with the ideal functionality $\mathcal{F}$ is computationally indistinguishable to the output of the real adversary $\mathcal{A}$ and the honest parties in a real execution of the secure MPC protocol $\phi$ with the multiple instance of the secure MPC protocol $\pi$. Here, inputs to the secure MPC protocol $\pi$ are determined by the secure MPC protocol $\phi$.

Definition 1 (Secure Computation):

Let k be the security parameter. An MPC protocol $\pi$ securely computes the ideal functionality $\mathcal{F}$ under concurrent general composition with computational security if for every non-uniform probabilistic polynomial-time real adversary $\mathcal{A}$ and every arbitrary secure MPC protocol $\phi$, there exists a non-uniform probabilistic polynomial-time ideal adversary $\mathcal{S}$ such that for every set of input $\chi$ to the secure MPC protocol $\pi$ and an auxiliary input z to the real adversary $\mathcal{A}$, the output of the ideal adversary and honest parties, denoted by $\text{HYBRID}^{\mathcal{F}}_{\phi, \mathcal{S}, \mathcal{A}(z)}(k, X)$, is computationally indistinguishable to the output of the real adversary $\mathcal{A}$ and the honest parties, denoted by $\text{REAL}_{\phi^\pi,\mathcal{A}(z)}(k,X)$ as described in equation 1 below.

$$\{\text{HYBRID}_{\phi,\mathcal{S}^{\mathcal{A}(z)}}^{\mathcal{F}}(k,X)\}_{k\in\mathbb{N},X\in\{0,1\}^*} \stackrel{c}{\equiv} \{$$
$$\text{REAL}_{\phi^\pi,\mathcal{A}(z)}(k,X)\}_{k\in\mathbb{N},X\in\{0,1\}^*} \quad \text{Equation 1:}$$

The secure MPC protocol with identifiable abort may achieve security with complete fairness and identifiable abort, meaning that the protocol terminates when either all of the MPC agents 210 receive the prescribed output or all the MPC agents 210 abort without receiving the output. In case of abort, all of the honest parties may learn the identity of one or more of the malicious (corrupted) parties. An ideal reactive function $\mathcal{F}_{GMPC}$ of a general computation MPC (GMPC) achieving such security is presented in Functionality 1 below where sid is a session identifier unique to each operation and varid is a unique index that identifies the secret shared value.

In Functionality 1, a ring refers to an algebraic structures used in abstract algebra which may consist of a set equipped with two binary operations that generalize the arithmetic operations of addition and multiplication. Every value stored by the Functionality 1 is indexed by a unique index varid. Functionality 1:

Functionality 1 ($F_{GMPC}$—Reactive Functionality)

The ideal functionality $F_{GMPC}$ is invoked with a set of corrupted parties I and a ring $\mathbb{R}$. I is minority and $\mathbb{R}$ is any finite ring in which every operation of the functionality is carried out. κ is the security parameter. $F_{GMPC}$ stores multiple pairs of a unique index and a value in the form (varid, x) for some $x \in \mathbb{R}$. We say varid is a new index when $F_{GMPC}$ does not store (varid, x) for some x. sid is a session identifier, which is unique to each unit operation. $F_{GMPC}$, once invoked, accepts the following setup once and only once. After this setup, $F_{GMPC}$ receives requests for various type of operations listed below.

On receiving (setup, sid, κ) from all the parties, $F_{GMPC}$ sends (setup, sid, κ) to S. If $F_{GMPC}$ receives (accept,sid) from s, it delivers (accept,sid) to all the parties. However, if $F_{GMPC}$ receives (abort, sid, $P_l \in$ I) from s, it delivers (abort, sid, $P_l$) to all the parties and aborts the functionality itself.

On receiving (random, sid, varid) from all the parties, where varid is a new index, $F_{GMPC}$ sends (random, sid, varid) to S. If $F_{GMPC}$ receives (accept, sid) from S, $F_{GMPC}$ randomly generates $x \in \mathbb{R}$, stores (varid, x), and delivers (accept, sid) to all the parties. However, if $F_{GMPC}$ receives (abort, sid, $P_l$ Å I) from s, it delivers (abort, sid, $P_l$) to all the parties.

On receiving (input, sid, varid, $P_k$, x) from $P_k$ and (input, sid, varid, $P_k$) from all the other parties, where varid is new and $x \in \mathbb{R}$, $F_{GMPC}$ sends (input, sid, varid, $P_k$) to S. If $F_{GMPC}$ receives (accept, sid) from S, $F_{GMPC}$ stores (varid, x) and delivers (accept, sid) to all the parties. However, if $F_{GMPC}$ receives (abort, sid, $P_l \in$ I) from s, it delivers (abort, sid, $P_l$) to all the parties.

On receiving (output, sid, varid, $P_j$) from all the uncorrupted parties where $F_{GMPC}$ has a record (varid, x), $F_{GMPC}$ sends (output, sid, varid, $p_j$) to S. $F_{GMPC}$ delivers (value, sid, varid, x) to $P_j$.[a]

[a] $F_{GMPC}$ accepts only one output for each varid to make the simulation simple.

On receiving (addc/multc, sid, varid, varid', v) from all the parties, where $F_{GMPC}$ has a record (varid', x'), varid is a new index, and $v \in \mathbb{R}$, $F_{GMPC}$ sends (addc/multc, sid, varid, varid', v) to S. If $F_{GMPC}$ receives (accept, sid) from S, $F_{GMPC}$ generates x=x'+v when addc or x=x'·v when multc, stores (varid, x), and delivers (accept, sid) to all the parties.

However, if $F_{GMPC}$ receives (abort, sid, $P_l \in$ I) from S, it delivers (abort, sid, $P_l$) to all the parties.

On receiving (add/malt, sid, varid, varid', varid") from all the parties, where $F_{GMPC}$ has records (varid', x') and (varid", x"), varid is a new index, $F_{GMPC}$ sends (add/mult, sid, varid, varid', varid") to S. If $F_{GMPC}$ receives (accept, sid) from S, $F_{GMPC}$ generates x=x'+x' when add or x=x'·x" when mult, stores (varid, x), and delivers (accept, sid) to all the parties. However, if $F_{GMPC}$ receives (abort, sid, $P_l \in$ I) from S, it delivers (abort, sid, $P_l$) to all the parties.

As seen in functionality 1, since the output operation always outputs the result to all of the honest (uncorrupted) parties if and only if all the honest parties agree to output data, and there are no other operations that output data, the functionality is fair. Moreover, since the $\mathcal{F}_{GMPC}$ always outputs (abort, sid, $P_i \in \mathfrak{T}$) in case of abort, where $\mathfrak{T}$ is the set of malicious (corrupted) parties, the abort is of the type identifiable, i.e. the identity of one or more of the malicious parties is identified. As the fairness and identifiable properties of the secure MPC protocol with identifiable abort are fulfilled the security of the secure MPC protocol with identifiable abort is thus proved.

For brevity, the secure MPC protocol with identifiable abort is demonstrated for a three-party computation where three MPC agents 210 designated $P_1$, $P_2$ and $P_3$ participate in the MPC using the secure MPC protocol with identifiable abort. However, the secure MPC protocol with identifiable abort may be applied to a plurality of MPC agents 210 and the demonstrated three-party computation should not be construed as limiting. The secure MPC protocol with identifiable abort targets high throughput MPC applications and is therefore based on secret sharing. An index i indicates a certain one of the MPC agents 210 (party), i=0 implies i=3 and i=4 implies i=1. Hence, $P_{i+1}$ is $P_1$ when i=3 and $P_{i-1}$ is $P_3$ when i=1. It is noted that indices of the MPC agents 210 (parties) are also used as indices of values, i.e. share values which may be referred to as values in an ideal functionality. Definition 2:

For any finite ring $\mathbb{R}$ and any element $v \in \mathbb{R}$ shares of v of $P_j$ for $j \in \{1, 2, 3\}$ in the replicated secret sharing as known in the art is $(v_j, v_{j-1})$ for randomly chosen $v_1, v_2, v_3 \in \mathbb{R}$ under the constraint $v_1+v_2+v_3=v \in \mathbb{R}$. The element v may be expressed by expression 1 below.

$$[v]:=([v]_1, [v]_2,[v]_3), [v]_j:=([v]_{j,1},[v]_{j,2}):=(v_j,v_{j-1}) \quad \text{Expression 1:}$$

It is easy to verify that the element v may be recovered from any two share values of [v], and the distribution of each share value of the MPC agents 210 is identical for any element v.

Let (Commit, Verify) be a commitment scheme. Given a message msg $\in \{0,1\}^*$ and a randomly chosen open $\in \{0, 1\}^k$ value which may be used with a com=Commit(msg, open) to open the commitment message msg, where Commit generates a commitment com $\in \{0, 1\}^k$ as com=Commit (msg, open) and Verify outputs either accept or reject. For all msg $\in \{0, 1\}^*$ and for all open $\in \{0, 1\}^k$, accept=Verify (Commit(msg, open), msg, open). Commitment schemes have hiding and binding properties. The commitment scheme described herein above is only computationally binding since a pair of arbitrary message and fixed length opening bears only a fixed length commitment.

Let Wcommit: $\{0,1\}^k \times \{0,1\}^k \times \{0,1\}^k \mapsto \{0,1\}^k \times \{0,1\}^k$ be such that for any msg $\in \{0,1\}^*$ and for randomly chosen wopen:=(open, open') $\in \{0, 1\}^k \times \{0,1\}^k$, Wcommit outputs wopen:=(com, com') $\in \{0,1\}^k \times \{0,1\}^k$ and such that com=Commit(msg, open) and com'=Commit(open, open'). As such wcom=Wcommit(msg, open, open').

Definition 3:

Let (wcom, wopen) be such that wcom:=(com, com') and wopen=(open, open'). It is said that (wcom, wopen) is correct if Verify(com', open, open')=accept. It is said that wopen is a valid opening of the wcom for the message msg ∈ {0, 1} if accept=Verify(com, msg, open).

Let arbitrary msg ∈ {0, 1}*, randomly chosen open ∈ {0, 1}$^k$ and open' ∈ {0,1}$^k$, wopen=(open, open') and wcom:= (com, com') ∈ {0,1}$^k$×{0,1}$^k$. For a given commitment (wcom, wopen) it is possible to verify whether or not the commitment is correct as a verifiable commitment. Given a correct commitment (wcom, wopen), for any msg ∈ {0,1}*, it is possible to prove either (and only either) that wopen is a valid opening of the wcom to the message msg ∈ {0, 1}* or that wopen is an invalid opening of the wcom to the message msg ∈ {0,1}*. In order to prove validity, the knowledge of wopen may be proved such that accept=Verify (com, msg, open). In order to prove invalidity, the knowledge of wopen may be proved such that accept≠Verify(com, msg, open) and accept=Verify(com', open, open'). For a valid wopen of wcom with respect to msg, due to the binding property of the second commitment, it is computationally hard to prove the knowledge of (open†, open‡) such that accept≠Verify(com, msg, open†) and accept=Verify(com', open†, open‡) for some open† and open‡. For an invalid wopen of wcom with respect to the message msg, due to the binding property of the second commitment, it is computationally hard to prove the knowledge of open† such that accept=Verify(com, msg, open†)) for some open†. [97] The secure MPC protocol with identifiable abort may further use some concepts applied in semi-honest Secure Protocol. Let a secret sharing of v, v' ∈ $\mathbb{R}$ be expressed by expression 2 below.

$$[v]:=((v_1,v_3),(v_2,V_1),(v_3,v_2)),\ [v']:=((v'_1,v'_3),(v'_2,v'_1),(v'_3,v'_2))$$

Expression 2:

Semi-honest secure addition operation and multiplication operations as known in the art are as follows:

Semi-honest secure addition. As in the Boolean case, addition gates are computed by locally adding the share values in the ring $\mathbb{R}$. More concretely, for each i ∈ {1, 2, 3}, $P_i$ computes its share value as $[v+v']=([v]_{i,1}, [v]_{i,2})$. That is $[v+v']=((v_1+v'_1, v_3+v'_3), (v_2+V'_2, v'_1), (v_3+v'_3, v_2+v'_2))$.

Semi-honest secure multiplication. Let $P_4$ and $P_0$ denote, respectively, $P_1$ and $P_3$. Assuming that for i=1, 2, 3, a party $P_i$ holds $\rho_i \in \mathbb{R}$ such that $\Sigma_{i=1}^{3} \rho_i = 0 \in \mathbb{R}$. It is noted that the parties $P_i$ may generate such correlated randomness $\rho_1, \rho_2, \rho_3 \in \mathbb{R}$ as much as needed from fixed length correlated randomness. Let v·v' denote the multiplication of v and v' in the ring $\mathbb{R}$.

In order to compute a $$\binom{2}{3}\text{-sharing}$$

of the product or two values v and v', that is [v·v'], the parties $P_i$ may operate as follows:

(1) For i ∈ {1, 2, 3}, $P_i$ computes its share value of $w_i = v_i \cdot v'_i + v_i \cdot v'_{i-1} + v_{i-1} \cdot v'_i + \rho_i$ and sends $w_i$ to $P_{i+1}$. Here, $v_4:=v_1$ and $v'_4:=v'_1$.

(2) For i ∈ {1, 2, 3}, $P_i$ defines its share value of w=v·v', that is $[w]_i$ is defined as $(w_i, w_{i-1})$. Here $w_0=w_3$.

The MPC agents 210 using the secure MPC protocol with identifiable abort may further compute multiplication triples to verify the committed share values.

Definition 4:

A multiplication triple in the ring $\mathbb{R}$ is a tuple of share values ([a], [b], [c]) among the MPC agents 210 $P_1$, $P_2$ and $P_3$ for a, b, c ∈ $\mathbb{R}$. It is said that a multiplication triple ([a], [b], [c]) is correct if a triple (a, b, c) reconstructed from the share values of honest parties, which are assumed to constitute a majority among the MPC agents 210, satisfies c=a·b.

Multiplication triples have the following properties: it is possible to efficiently validate whether a multiplication triple is correct (i.e., whether c=a·b) by opening the multiplication triple and it is possible to efficiently verify if a multiplication triple ([a], [b], [c]) is correct without opening the multiplication triple by using another correct multiplication triple ([a'], [b'], [c']). The latter check is such that if one multiplication triple is correct and the other multiplication triple is not, then the adversary may always be caught. Furthermore, nothing may be learned about the values a, b, c while the multiplication triple ([a'], [b'], [c']) is discarded ("wasted") and may not be used again.

Techniques of MPC multiplication using multiplication triples are known in the art and have been used extensively to achieve efficient secure MPC computation in many protocols known in the art. Moreover, as known in the art a large number of multiplication triples may be generated where, as long as a malicious (cheating) is not detected, each triple is correct with high probability. Using the secure MPC protocol with identifiable abort, the MPC agents 210 may generate a large number of multiplication triples with semi-honest secure MPC multiplication, randomly open a small portion of the multiplication triples to verify the multiplication triples are correct with a certain probability, randomly group the rest of the multiplication triples in "buckets", which is a set of triples, and mutually verify the multiplication triples within each bucket.

The secure MPC protocol with identifiable abort that securely realizes the reactive function $\mathcal{F}_{GMPC}$ (presented in Functionality 1) may generate multiplication (Beaver) triples using a multiplication triples generator $\mathcal{F}_{triple}$ as presented in Functionality 2 below. An exemplary protocol realizing the multiplication triples generator $\mathcal{F}_{triple}$ is presented in Protocol 8 below.

Functionality 2:

Functionality 2 ($F_{triple}$ Multiplication Triple Generation)

The ideal functionality $F_{triple}$ is invoked with a set of corrupted parties I. We say varid is a new index to $F_{triple}$ when $F_{GMPC}$ does not store (varid, [a], [b], [c]). $F_{triple}$, once invoked, accepts the following setup once and only once. After this setup, $F_{triple}$ receives requests of (triple, sid, varid).

On receiving (setup, sid, κ) from all the parties, $F_{triple}$ sends (setup, sid, κ) to S. If $F_{triple}$ receives (accept, sid) from S, it delivers (accept, sid) to all the parties. However, if $F_{triple}$ receives (abort, sid, $P_I \in I$), it delivers (abort, sid, $P_I$) to all the parties and aborts the functionality itself.

On receiving (triple, sid, varid) from all the uncorrupted parties, where varid is a new index to $F_{triple}$, $F_{triple}$ sends (triple,sid,varid) to S. If $F_{triple}$ receives (accept, sid, (([a']$_k$, [b']$_k$, [c']$_k$)$_{k \in I}$) from S, $F_{triple}$ generates ([a], [b], [c]) such that "[a]$_k$=[a']$_k$, [b]$_k$=[b']$_k$, [c]$_k$=[c']$_k$" for all k ∈ I and a·b=c for randomly generated a, b ∈ $\mathbb{R}$, stores (varid, [a], [b], [c]), and sends (accept, sid, ([a]$_j$, [b]$_j$, [c]$_j$)) to each $P_j$.

On receiving (verify,sid,varid) from $P_j$, where $F_{triple}$ stores (varid, [a],[b],[c]), $F_{triple}$ generates open$_{varid,j}^{triple}$ ∈

$\{0,1\}^k$ and $\text{com}_{\text{varid},j}^{\text{triple}} = \text{Commit}(([a]_{j,2}[b]_{j,2}, [c]_{j,2}, \text{open}_{\text{varid},j}^{\text{triple}})$, and sends (verify, sid,varid, $P_j$) to S. Then $F_{\text{triple}}$ sends (accept, sid, varid, $P_j$, $\text{com}_{\text{varid},j}^{\text{triple}}$) to all parties, and sends (accept, sid, varid, $P_j$, $([a]_{j,2})$, $[b]_{j,2}$, $[c]_{j,2}$), $\text{open}_{\text{varid},j}^{\text{triple}})$ to $P_j$.

Protocol 8:

Protocol 8 (Multiplication Triple Generation in Background $\pi_{\text{triple}}$)

Let N, m, C be appropriately chosen for given κ by the method given in [1].

When each party $P_j$ for $j \in \{1,2,3\}$ receives (setup, sid, κ, $\text{seed}_j$, $\text{seed}_{j-1}$), all the parties do as in the following;

1. For each $j \in \{1,2,3\}$ and for i=1, . . . , Nm+C, $P_j$ generates $[a'_i]_j = (\text{Hash}_\mathbb{R}(\text{triple\_iva}, i, \text{seed}_j), \text{Hash}_\mathbb{R}(\text{triple\_iva}, i, \text{seed}_{j-1}))$ $[b'_i]_j$ $\text{Hash}_\mathbb{R}(\text{triple\_ivb}, i, \text{seed}_j)$, $\text{Hash}_\mathbb{R}(\text{triple\_ivb}, i, \text{seed}_{j-1}))$ $[c'_i]_{j,1} = [a]_{j,1} \cdot [b]_{j,1} + [a]_{j,1} \cdot [b]_{j,2} + [a]_{j,1} \cdot [b]_{j,2} + \text{Hash}_\mathbb{R}(\text{triple\_ivc}, i, \text{seed}_j) - \text{Hash}_\mathbb{R}(\text{triple\_ivc}, i, \text{seed}_{j-1})$ 2. For each $j \in \{1,2,3\}$, $p_j$ generates $\text{wopen}_j \in \times \{0,1\}^k$, $([c'_i]_{j=1}, \ldots, _{Nm+C}$, and $\text{wcom}_j = \text{wcommit}(([c'_i]_{j,1}, \ldots, _{Nm+C}, \text{wopen}_j)$ and broadcasts $\text{wcom}_j$, and $P_j$ also sends $([c'_i]_{j,1})_{j=1}, \ldots, _m{}_{Nm+C}$, and $\text{wopen}_j$ to $p_{j+1}$. For each $j \in \{1,2,3\}$ and for i=1, . . . , Nm+C, $P_j$ sets $([c'_i]_j = ([c'_i]_{j,1}, [c'_i]_{j-1,1})$.

3. All the parties collaborate in shuffling $([a'_i], [b'_i], [c'_i])_{i=1}, \ldots, _{Nm+C}$. Every pair of parties open the last C triples to check if $a_i \cdot b_i = c_i$. If the equation does not hold for any pair of parties, every party $P_j$ proves in zeroknowledge that it has obeyed the protocol with $\text{seed}_j$. All the parties output (abort, sid, $P_j$) for such $P_j$ that did not obey the protocol. All the parties remove the sampled C triples from the sequence.

4. All the parties randomly generates N buckets of m triples from the sequence of Nm triples. For each bucket, using the last m−1 triples, verify if the firs triple is correct. If it does not hold for any bucket with respect to any pair of parties, every party $P_j$ proves in zeroknowledge that it has obeyed the protocol with $\text{seed}_j$. All the parties output (abort, sid, $P_j$) for such $P_j$ that did not obey the protocol. Let $([a_k], [b_k], [c_k])_{k=1}, \ldots, _N$ be this N triples made of first triples in buckets.

5. For each $j \in \{1,2,3\}$, $P_j$ generates $\text{wopen}'_j \in \{0,1\}^k \times \{0,1\}^k$ and $\text{wcom}'_j{}^{\text{triple}} = \text{wcommit}(([a_k]_{j,1}, [b_k]_{j,1}, [c_k]_{j,1})_{k=1}, \ldots, _N, \text{wopen}'_j)$, broadcasts $\text{wcom}'_j{}^{\text{triple}}$, and send $\text{wopen}'_j$ and $([a_k]_{j,1}, [b_k]_{j,1}, [c_k]_{j,1})_{k=1}, \ldots, _N$ to $P_{j+1}$. Then, for each $j \in \{1,2,3\}$, $P_j$ verifies if $\text{wopen}'_{j-1}$ is a valid opening of $\text{wcom}'_{k-1}{}^{\text{triple}}$ with respect to $([a_k]_{j,2}, [b_k]_{j,2}, [c_k]_{j,2})_{k=1}, \ldots, _N$. If it is not, $P_j$ and $P_{j-1}$ prove in zeroknowledge that they have obeyed the protocol with $\text{wopen}_{j-1}$, $\text{wopen}'_{j-1}$, and $\text{seed}_{j-1}$. Here, all the parties have $\text{wcom}'_{j-1}{}^{\text{triple}}$, $\text{wopen}'_{j-1}$, $\text{com}_{j-1}$, and $\text{wopen}_{j-1}$, and how they shuffled the sequence of triples via authenticated broadcast channel. Hence, the proof is with respect to these commitments. All the parties output (abort, sid, $P_j$) for such $P_j$ that did not obey the protocol.

When all the parties receives (triple, sid, valid), they randomly chooses $k \in \{1, \ldots, N\}$ and $P_j$ outputs (accept, sid, valid, $([a_k]_j, [b_k]_j, [c_k]_j))$. This triple is removed from the sequence and this k will never be chosen.

On receiving (verify, sid, varid), $P_1$ sends (verify, sid, varid, $P_j$) to all other parties. $P_1$ outputs (accept, sid, varid, $P_j$, $\text{com}_{\text{varid},j}^{\text{triple}} = \text{com}'_{\text{varid},j}^{\text{triple}})$ and (accept, sid, varid, $\text{open}'_{\text{varid},j}^{\text{triple}})$. The other parties outputs (accept, sid, varid, $P_j$, $\text{com}'_{\text{varid},j}^{\text{triple}})$. Note that $\text{com}'_j{}^{\text{triple}} = \text{Commit}(([a_k]_{j,2}, [b_k]_{j,2}, [c_k]_{j,2})_{k=1}, \ldots, _N, \text{open}'_{\text{varid},j}^{\text{triple}})$ within $\text{wcom}'_{\text{varid},j}^{\text{triple}}$ that $P_{j-1}$ has broadcasted once is also a commitment to $([a_k]_{j,2}, [b_k]_{j,2}, [c_k]_{j,2})$ for any k. And $\text{open}'_{\text{varid},j}^{\text{triple}}$ an opening of $\text{com}_j^{\text{triple}}$.

The secure MPC protocol with verifiable abort may follow other secure MPC protocols with abort as known in the art with several modifications. Specifically, while executing the secure MPC protocol with verifiable abort, the MPC agents 210 may generate verifiable commitment to share values they commit (send). Based on these commitments, when the verification of one or more share value tuples fails, the MPC agents 210 may be able to identify one or more malicious parties which deviated from the secure MPC protocol. The MPC agents 210 may output these commitments and their respective openings when they receive an instruction (Verify, sid, varid) for some varid.

As discussed before, the secure MPC protocol with identifiable abort is demonstrated for a three-party computation for the three MPC agents 210 $P_1$, $P_2$ and $P_3$. It is stresses that the secure MPC protocol with identifiable abort may be extended an MPC conducted by a plurality of MPC agents 210 and the demonstrated three-party computation should therefore not be construed as limiting.

Let the MPC agents 210 $P_1$, $P_2$ and $P_3$ share an element $x = x_1 + x_2 + x_3$ in $\mathbb{R}$ as $(x_1, x_3)$ for the party $P_1$, $(x_2, x_1)$ for the party $P_2$ and $(x_3, x_2)$ for the party $P_3$. Assuming the party $P_1$ maliciously modified its share value to $(x_1, x'_3)$ for $x'_3 \neq x_3$. Using the secure MPC protocols with abort as known in the art, even if all the parties $P_1$, $P_2$ and $P_3$ share their share values with each other, the party $P_2$ may be unable to identify the malicious party since the party $P_2$ may be unable decide whether the party $P_1$ modified $x_3$ into $x'_3$ or whether the party $P_3$ modified $x'_3$ into $x_3$. This problem may be common to all information theoretically secure MPC protocols.

The secure MPC protocol with identifiable abort therefore introduces a new notion agreed share values which may enable the honest parties to agree on the valid (right) share values. For each $k \in \{1, 2, 3\}$, the agreed share of $x = x_1 + x_2 + x_3$ in $\mathbb{R}$ for each party $P_j$ may be expressed as $(x_j, x_{j-1}, \text{com. open})$ where open and $\text{com} = \text{Commit}(x_{j-1}, \text{open})$ are generated by the party $P_{j-1}$ and com is broadcasted by the party $P_{j-1}$ in an authenticated manner. Based on the agreed share value and randomness committed during an initialization phase, once the malicious (cheating) party is detected, the honest parties may be able to reconstruct the secure MPC session (protocol) from an agreed share value and identify which of the MPC agents 210 is has cheated (modified the share value) at which point of the MPC. For example, the honest parties may construct the secure MPC session (protocol) as follows. The behavior of each of the parties is determined by its input, the randomness, and commitment messages the party receives during the MPC session (protocol).

The input is the share value(s) which is agreed and the randomness is committed at the initialization phase. The commitment messages are committed and broadcasted.

Hence, every data a certain party generates may be verified whether it is honestly generated if all of share values, randomness, and messages are revealed. As zero-knowledge protocols enable a party to prove to a verifier that it generated committed messages from committed inputs and randomness without opening the commitment to the verifier, using the same technique the party may prove to other parties that it reconstructed the MPC session (protocols) honestly (if it indeed did so).

The parties $P_1$, $P_2$ and $P_3$ employing the secure MPC protocol with identifiable abort communicate with each other using private and broadcast channels supported by the network 230. The broadcast channels allow each of the parties $P_1$, $P_2$ and $P_3$ to transmit one or more messages to all other parties while the private channels allow each of the parties $P_1$, $P_2$ and $P_3$ to transmit one or more messages to a certain one of the other parties. Each of the broadcast messages exchanged between the parties $P_1$, $P_2$ and $P_3$ is encoded for authentication of the originating party that sent the message. Each of the private messages exchanged between the parties $P_1$, $P_2$ and $P_3$ is encrypted for both authentication of the originating party as well as encryption of the message content such that only the destination party may decode the private message.

The secure MPC protocol with identifiable abort is composed of two main procedures. The first procedure which is denoted $\pi_{GMPC}$ described in Protocol 3 below, basically follows secure MPC protocols with abort as known in the art with some modifications made to apply provisions for identifying the malicious party in case a cheating malicious party is detected. The second procedure which is denoted $\pi_{identify}$ described in Protocol 4 below, is executed by the parties $P_1$, $P_2$ and $P_3$ to identify the identity of the malicious party after the malicious party is detected. It is noted that a concrete protocol for guaranteed output delivery is not presented as it may be guaranteed by general secure two-party computation among honest parties once the malicious (cheater) party is identified.

For the $\pi_{GMPC}$ procedure and the $\pi_{identify}$ procedure sid denotes a session identifier unique to each operation, for example setup, random, input, output, addc, add, mult, mulct and/or the like and varid is a unique index that identifies the secret share value. It is said that varid exists when each honest party $P_j$ is storing varid, $[x]_j$, $\overrightarrow{com}^{varid}$, $open_{j-1}^{varid}$) where $\overrightarrow{com}^{varid}$ is a set of $(com_j^{varid})_{j \in \{1,2,3\}}$ such that $com_j^{varid}$ is a commitment to a share value $[x]_{j,1}$ that the honest party $P_j$ broadcasted as $(com_j^{varid}, com'_j^{varid}) := wcom_j^{varid}$, and $open_{j-1}^{varid}$ is the opening of $com_j^{varid}$.

For $wcom_{lowerscript}^{upperscript}$, it is assumed that the components of $wcom_{lowerscript}^{upperscript}$ are $(com_{lowerscript}^{upperscript}, com'_{lowersecript}^{uppersecript} = wcom_{lowerscript}^{upperscript}$ and $(open_{lowerscript}^{upperscript}, open'_{lowerscript}^{upperscript} = wopen_{lowerscript}^{upperscript}$.

It is said that varid is a new index when varid does not exist.

When a party sends a wopen in a private message to another (destination) party and broadcasts wcom in a broadcast message in the same communication round, the destination party may consider that the private message of wopen is not in valid form if (wcom, wopen) is not correct. Or, when a party sends a private message of wopen and msg to another (destination) party and broadcast com in a broadcast message in the same communication round, the destination party may consider that the private message of open and msg is not in valid form if reject=Verify(com, msg, open).

It is assumed that, if a certain party did not send a private message in a valid form (format) as required by the secure MPC protocol, all the parties may be able to recognize the certain party and consider this party as a malicious party (a cheater). Therefore the MPC secure protocol with identifiable abort may no handle such cases in which a certain party(s) transmits messages which are not in valid form, i.e. do not comply with the secure MPC protocol.

Let $Hash_\mathbb{R}: \mapsto \mathbb{R}$ be a cryptographic hash function that outputs an element of $\mathbb{R}$. Define $\delta_{j,i}=1$ only when i=j, otherwise $\delta_{j,i}=0$. Let [1] be such public share values of 1 that is $[1]_j := ([1]_{j,1}, [1]_{j,2}) = (\delta_{j,1}, \delta_{j,2})$ for $j \in \{1, 2, 3\}$.

Protocol 3:
Protocol 3 (Security with Identifiable Abort $\pi_{GMPC}$)
Setup: When all the parties received (setup, sid, $\kappa$), parties do as the following.

1. For each $j \in \{1,2,3\}$, $P_j$ randomly generates $seed_j \in \{0,1\}^k$ and $open_j^{seed} \in \{0,1\}^k$, generates $com_j^{seed}$=Commit($seed_j$, $open_m^{seed}$), sends $open_j^{seed}$ and $seed_j$ to $P_{j+1}$ and broadcasts $com_j^{seed}$.

2. For each $j \in \{1,2,3\}$, $P_j$ sends (setup, sid, $\kappa$) to $F_{triple}$. If a party receives (abort, sid, $P_k$) from $F_{triple}$, the party outputs (abort, sid, $P_k$) and abort the protocol. If a party receives (accept, sid) from $F_{triple}$, the party proceeds to the next step.

3. If all the above processes are successful, all parties output (accept, sid). Otherwise, they output (abort, sid, $P_k$) for $P_k$ who deviated the protocol.

Random: When all the parties received (random, sid, varid) for new varid, the parties do as the following for each $j \in \{1,2,3\}$:

1. $P_j$ generates $[x]_j = (Hash_\mathbb{R}(rand\_iv, sid, varid, seed_j),$
$\quad Hash_\mathbb{R}(rand\_iv, sid, varid, seed_{j-1}))$
$wopen_j^{varid} \in_R \{0,1\}^k \times \{0,1\}^k,$
$wcom_j^{varid} = Wcommit([x]_{j,1}, wopen_j^{varid})$ 2. $P_j$ broadcasts (random_brd, sid, varid, $wcom_j^{varid}$) and sends (random_msg, sid, varid, $wopen_j^{varid}$) to $P_{j+1}$.

3. $P_j$ verifies if $wopen_{j-1}^{varid}$ is a valid opening of $wcom_{j-1}^{varid}$ with respect to $([x]_{j,2})$ and, if it is not valid, broadcasts $\perp_{random}$. If any party broadcasted $\perp_{random}$, all the parties proceed to $\pi_{identify}$.

4. $P_j$ stores (varid, $[x]_j$, $\overleftarrow{com}^{varid}$, $open_{j-1}^{varid}$) and outputs (accept, sid).

Input: When $P_k$ received (input, sid, varid, $P_k$, x) and all other parties received (input, sid, varid, $P_k$) for new varid, all the parties do as in the following.

1. $P_k$ randomly generates $\{x_1, x_2, x_3\} \in_R \mathbb{R}$ such that $x_1+x_2+x_3=x$. Then, for $j \in \{1,2,3\}$, $P_k$ generates $[x]_j = (x_j, x_{j-1}), open_k^{varid,j} \in_R \{0,1\}^k, com_k^{varid,j} = Commit(x_j, open_k^{varid,j})$ 2. $P_k$ broadcasts (input_brd1, sid, $P_k$, varid, $com_k^{varid,1}$, $com_k^{varid,2}$, $com_k^{varid,3}$). Then, $P_k$ sends (input_msg1, sid, $P_k$, varid, $[x]_j$, $open_k^{varid,j}$, $open_k^{varid,j-}$) to $P_j$ for $j \in \{1,2,3\}$.

3. For each $j \in \{1,2,3\}$, $P_j$ generates $wopen_j^{varid} \in \{0,1\}^k \times \{0,1\}^k, wcom_j^{varid} = Wcommit([x]_{j,1}, wopen_j^{varid})$ 4. For each $j \in \{1,2,3\}$, $P_j$ sends (input_msg2, sid, varid, $wopen_j^{varid}$) to $P_{j+1}$, and broadcasts (input_brd2, sid, varid, $wcom_j^{varid}$).

5. For each $j \in \{1,2,3\}$, $P_j$ verifies if $wopen_{j-1}^{varid}$ is a valid opening of $wcom_{j-1}^{varid}$ with respect to $([x]_{j,2})$ and, if it is not valid, $P_j$ broadcasts $\perp_{input}$. If any party broadcasted $\perp_{input}$, all the parties proceed to $\pi_{identify}$.

6. For each $j=1,2,3$, $P_j$ stores (varid, $[x]_j$, $\overleftarrow{com}^{varid}$, $open_{j-1}^{varid}$) and outputs (accept, sid).

Output: When all the parties received (output, sid, varid, $P_k$) for $k \in \{1,2,3\}$ where each honest party $P_j$ for $j \in \{1,2,3\}$ stores (varid, $[x]_j$, $\overleftarrow{com}_{j-1}^{varid}$, $open_{j-1}^{varid}$), the parties do as the following.

1. For each $j \in \{1,2,3\}$, $P_j$ sends to $P_k$ the message (output_msg, sid, varid, $[x]_j$, $open_{j-1}^{varid}$). Then, from all $P_j$ for $j \in \{1,2,3\}$, $P_k$ receives (output_msg, sid, varid, $[x]_j$, $open_{j-1}^{varid}$).

2. $P_k$ verifies if it hold that $[x]_{1,1}=[x]_{2,2}$, $[x]_{2,1}=[x]_{3,2}$, $[x]_{3,1}=[x]_{1,2}$.

If it does, $P_k$ generates $x=[x]_{1,1}+[x]_{1,2}+[x]_{3,2}$

If it does not, $P_k$ identifies $j \in \{1,2,3\}$ such that $com_{j-1}^{varid}$ is not a valid commitment to (varid, $[x]_{j,2}$) by using $open_{j-1}^{varid}$. Then, $P_k$ generates $x=[x]_{j-1,1}+[x]_{j-1,2}+[x]_{j+1,2}$ 3. $P_k$ outputs (value, sid, varid, x).

Multiply: When all the parties received (mult, sid, varid, varid', varid") where varid is new, each uncorrupted party $P_j$ stores (varid', $[x']_j$, $\overleftarrow{com}^{varid'}$, $open_{j-1}^{varid}$) and (varid", $[x"]_j$, $\overleftarrow{com}_{j-1}^{varid"}$, the parties do as in the following;

1. For each $j \in \{1,2,3\}$, $P_j$ generates $\rho_j = Hash_{\mathbb{R}}$(mult_iv1,sid,vari,seed$_j$)−
$Hash_{\mathbb{R}}$(mult,iv1,sid,varid,seed$_{j-1}$)$[x]_{j,1}=[x']_{j,1}$·
$[x"]_{j,1}+[x']_{j,1}\cdot[x"]_{j,2}+[x']_{y,2}\cdot[x"]_{j,1}+\rho_j$
$open_j^{varid} \in_R \{0,1\}^k com^{varid}$=Committ($[x]_{j,1}$, $open_j^{varid}$)

2. For each $j \in \{1,2,3\}$, $P_j$ sends (mult_msg1$_j$, sid, varid, $[x]_{j,1}$, $open_j^{varid}$) and broadcasts (mult_brd1, sid, varid, $com_j^{varid}$).

3. For each $j \in \{1,2,3\}$, $P_j$ sends (triple, sid, varid) to $F_{triple}$ and obtains (accept, sid, $[a]_j$, $[b]_j$, $[c]_j$).

4. For each $j \in \{1,2,3\}$, $P_j$ generates $[x]_j=([x]_{j,1},[x]_{j-1,1}),[r]_j=[x']_j+[a]_j,[s]_j=[x"]_j+[b]_j$
$wopen_j^{varid,1} \in_R \{0,1\}^k \times \{0,1\}^k, open_j^{varid,2} \in_R \{0,1\}^k wcom_j^{varid,1}=Wcommit(([a]_{j,1},[b]_{j,1},[c]_{j,1}),$
$wopen_j^{varid,1})com_j^{varid,2}=Commit([r]_{j,2},[s]_{j,2},$
$open_j^{varid,2})$ 5. For each $j \in \{1,2,3\}$, $P_j$ sends (mult_msg2,sid, varid, $[r]_{j,2}$, $[s]_{j,2}$, $wopen_j^{varid,1}$, $open_j^{varid,2}$) to $P_{j+1}$ and broadcasts (mult_brd2, sid, varid, $wcom^{varid,1}$, $com^{varid,2}$).

6. For each $j \in \{1,2,3\}$, $p_j$ verifies if $w\ open_{j-1}^{varid,1}$ is a valid opening of $wcom_{j-1}^{varid,1}$ with respect to ($[a]_{j,2}$, $[b]_{j,2}$, $[c]_{j,2}$) and, if it is not, $p_j$ broadcasts $\perp_{mult,1}$. If any party broadcasted $\perp_{mult\_1}$, all proceed to $\pi_{identify}$.

7. For each $j \in \{1,2,3\}$, $P_j$ generates $r_j=[r]_{j,1}+[r]_{j,2}+[r]_{j-1,2}, s_j=[s]_{j,1}+[s]_{j,2}+[s]_{j-1,2}$ $[o]_j=-[x]_j+r_j\cdot s_j\cdot[1]_j-s_j\cdot[a]_j-r_j\cdot[b]_j+[c]_j$ $Q_j=Hash_{\mathbb{Z}_{2^K}}$(mult_iv2,sid,varid,seed$_j,r_j,s_j$)

$Q'_j=Hash_{\mathbb{Z}_{2^K}}$(mult_iv3,sid,varid,seed$_j,[o]_{j,2}$)
$(open_j^{varid,3}, open_j^{varid,4}) \in_R \{0,1\}^k \times \{0,1\}^k$ $(com_j^{varid,3})$=Commit($Q_j, open_j^{varid,3}$), $(com_j^{varid,4})$=Commit($Q'_j, open_j^{varid,4}$)

8. For each $j \in \{1,2,3\}$, $P_j$ sends (mult_msg3, sid, varid, $Q_j$, $open_j^{varid,3}$) to $P_{j+1}$, and broadcasts (mult_brd3, sid, varid, $com_j^{varid,3}$).

9. For each $j=1,2,3$, $P_j$ verifies if the following equation holds and, if it is not, $P_j$ broadcasts $\perp_{mult\_2}$ $Q_{j-1}=Hash_{\mathbb{Z}_{2^K}}$(mult_iv2,sid,varid,seed$_{j-1},r_j,s_j$)

If any party broadcasted $\perp_{mult\_2}$, all the parties proceed to $\pi_{identify}$.

10. For each $j \in \{1,2,3\}$, $P_j$ sends (mult_msg4, sid, varid, $Q'_j, open_j^{varid,4}$) to $P_{j+1}$, and broadcasts (mult_brd4, sid, varid, $Q'_j$, $com_j^{varid,4}$).

11. For each $j=1,2,3$, $P_j$ verifies if the following equation holds and, if it is not, $P_j$ broadcasts $\perp_{mult\_3}$.

$Q'_{j-1}=Hash_{\mathbb{Z}_{2^K}}$(mult_iv3,sid,varid,seed$_{j-1}$,−$[o]_{j,1}$−$[0]_{j,2}$)

If any party broadcasted $\perp_{mult\_3}$, all the parties proceed to $\pi_{identify}$.

12. For each $j=1,2,3$, $p_j$ stores (varid, $[x]_j$, $\overleftarrow{com}^{varid}$, $open_{j-1}^{varid}$) and outputs (accept, sid).

Add with Constant/Multiply with Constant/Add: When all the parties received (addc, sid, varid, varid', varid", v)/(multc, sid, varid, varid', v)/(add, sid, varid, varid', varid") where $v \in \mathbb{R}$, varid is a new index, and each uncorrupted party $P_j$ stores (varid', $[x']_j$, $\overleftarrow{com}^{varid'}$, $open_{j-1}^{varid'}$) (and (varid", $[x"]_j$, $\overleftarrow{com}^{varid"}$, $open_{j-1}^{varid"}$) if add), the all parties do as in the following;

1. For each $j \in \{1,2,3\}$, generates $[x]_j = \begin{cases} ([x]_{j,1} + v \cdot [1]_{j,1}, [x]_{j,2} + v \cdot [1]_{j,2}) & \text{if } addc \\ ([x']_{j,1} \cdot v, [x']_{j,2} \cdot v) & \text{if } multc \\ ([x']_{j,1} + [x"]_{j,1}, [x']_{j,2} + [x"]_{j,2}) & \text{if } add \end{cases}$ $wopen_j^{varid} \in \{0,1\}^k \times \{0,1\}^k, wcom_j^{varid} = Wcommit([x]_{j,1}, wopen_j^{varid})$ 2. For each $j \in \{1,2,3\}$, $P_j$ sends (addc_msg/multc_msg/add_msg, sid, varid, $open_j^{varid}$) to $P_{j+1}$, and broadcasts (addc_brd/multc_brd/add_brd, sid, varid, $com_j^{varid}$).

3. For each $j \in \{1,2,3\}$, $P_j$ verifies if $wopen_{j-1}^{varid}$ is a valid opening of the $wcom_{j-1}^{varid}$ with respect to ($[x]_{j,2}$) and, if it is not valid, $P_j$ broadcasts $\perp_{addc/multc/add}$. If any party broadcasted $\perp_{addc/multc/add}$, all the parties proceed to $\pi_{identify}$ 4. For each $j=1,2,3$, $P_j$ stores (varid, $[x]_j$, $\overleftarrow{com}^{varid}$, $open_{j-1}^{varid}$) and then outputs (accept, sid).

The $\pi_{identify}$ procedure which is the malicious (cheater) party(s) identification part of the secure MPC protocol with identifiable abort is basically used by the parties to prove and verify the behavior of each of the MPC agents 210, specifically, verifying the share values committed by each of the MPC agents 210. The verification is based on zero-knowledge proof (argument) of knowledge and therefore each operation of the MPC starts from either agreed share values, verifiable share values and/or reconstructable share values and ends in agreed share values. Moreover every randomness process in the secure MPC protocol is provided by one or more pseudorandom functions with one or more committed seeds. The seeds may be short random numbers which may be extended using the pseudorandom function(s) in order to establish the randomness used for encrypting the messages. An MPC agents 210 (party) may use the randomness which may include for example, a cryptographic key or random sampling and/or the like to prevent a malicious party (adversary) from guessing the cryptographic key. Based on these two properties, each of the MPC agents 210 may be able to verify the validity of its behavior, i.e. generated and transmitted messages, specifically, to verify its committed share values.

Protocol 4:

Protocol 4 (Cheater Identification Protocol $\pi_{identify}$)

Parties proceeds to $\pi_{identify}$ when a party broadcasts $\perp$, for some *. The parties runs this protocol depending on this $\perp$, as in the following.

Case $\perp$. such that * ≠ mult: For each $j \in \{1,2,3\}$, $P_j$ does as in the following:

If $P_j$ output $\perp$, $P_j$ outputs (abort, sid, $P_{j-1}$).

If $P_j$ did not output $\perp$, but $P_{j+1}$ sid, $P_j$, outputs (abort, sid, $p_{j+1}$).

If neither $P_j$ nor $p_{j+1}$ output $\perp$.

1. If $\perp_{random}$, $P_{j-1}$ proves to $P_j$ in zeroknowledge the knowledge of (wopen$_{j+1}^{varid}$, $[x]_{j-1,2}$, seed$_{j+1}$, open$_{j+1}^{seed}$) such that:

$[x]_{j-1,2}$=$Hash_\mathbb{R}$(rand_iv,sid,varid,seed$_{j+1}$)

accept≠Verify(com$_{k+1}^{varid}$,[x]$_{j-1,2}$,open$_{j+1}^{varid}$)

accept=Verify(com'$_{j+1}^{varid}$,open$_{j+1}^{varid}$,open'$_{j+1}^{varid}$)

accept=Verify(com$_{j+1}^{seed}$,seed$_{j+1}$,open$_{j+1}^{seed}$)

where com$_{j+1}^{seed}$, wcom$_{j+1}^{varid}$, varid, and sid are owned by both parties.

2. If $\perp_{input}$, $P_{j-1}$ proves to $P_j$ in zeroknowledge the knowledge of ($[x]_{j-1,2}$, open$_k^{varid,j+1}$, open$_{j+1}^{varid}$, open'$_{j+1}^{varid}$) such that:

accept=Verify(com$_k^{varid,j+1}$,[x]$_{j-1,2}$,open$_k^{varid,j+1}$)

accept≠Verify(com$_{k+1}^{varid}$,[x]$_{j,2}$,open$_{j+1}^{varid}$)

accept=Verify(com'$_{j+1}^{varid}$,open$_{k+1}^{varid}$,open'$_{j+1}^{varid}$)

where (com$_k^{varid,j+1}$, wcom$_{k+1}^{varid}$, sid, and varid are owned by both parties.

3. If $\perp_{add/addc/multc}$, $P_{k-1}$ proves to $P_j$ in zeroknowledge the knowledge of $[x]_{j-1,2}$, open$_{j+1}^{varid}$, $[x']_{j-1,2}$, open$_{j+1}^{varid'}$ (and $[x'']_{j-1,2}$, open$_{j+1}^{varid''}$ if $\perp_{add}$) such that:

accept=Verify(com$_{j+1}^{varid'}$,[x']$_{j-1,2}$,open$_{j+1}^{varid'}$)

accept=Verify(com$_{j+1}^{varid''}$,[x'']$_{j-1,2}$,open$_{j+1}^{varid''}$) if add $$[x]_{j-1,2} = \begin{cases} [v]_{j-1,2} + [x']_{j-1,2} & \text{if } \perp_{addc} \\ v \cdot [x']_{j-1,2} & \text{if } \perp_{multc} \\ [x']_{j-1,2} + [x'']_{j-1,2} & \text{if } \perp_{add} \end{cases}$$

accept≠Verify(com$_{j+1}^{varid}$,[x]$_{j-1,2}$,open$_{j+1}^{varid}$)

accept=Verify(com'$_{j+1}^{varid}$,open$_{j+1}^{varid}$,open'$_{j+1}^{varid}$)

where v, com$_{j+1}^{varid'}$, com$_{j+1}^{varid''}$, wcom$_{+1}^{varid}$, sid, varid, and varid' are owned by both parties.

4. If the above proof is successful, $P_j$ outputs (abort, sid, $P_{j+1}$). Otherwise, $P_j$ outputs (abort, sid, $P_{j-1}$).

Case and $\perp_{mult\_1}$, $\perp_{mult\_2}$, and $\perp_{mult\_3}$: For each $j \in \{1,2,3\}$, $P_j$ runs the following protocol with $P_{j-1}$.

1. For each $j \in \{1,2,3\}$, if $P_i$ is among those who broadcasted $\perp_{mult\_1}$, $P_j$ sends (verify, sid, varid, $P_j$) to $F_{triple}$. Then, $F_{triple}$ sends (accept, sid, varid, $P_j$, com$_{varid,j}^{triple}$) to all parties, and sends (accept, sid, varid, $P_j$,([a]$_{j,2}$, [b]$_{j,2}$, [c]$_{j,2}$), open$_{varid,j}^{triple}$) to $P_j$. Then, $P_j$ proves to all other parties in zeroknowledge the knowledge of wopen$_{j-1}^{varid,1}$, open$_{varid,j}^{triple}$, [a]$_{j,2}$, [b]$_{j,2}$, and [c]$_{j,2}$ such that accept=Verify(com$_{varid,j-1}^{triple}$,([a]$_{j,2}$[b]$_{j,2}$[c]$_{j,2}$), open$_{varid,j-1}^{triple}$)

accept=Verify(com$_{j-1}^{varid,1}$,([a]$_{j,2}$[b]$_{j,2}$[c]$_{j,2}$), open$_{j-1}^{varid,1}$)

accept=Verify(com$_{j-1}^{varid,1}$,open$_{j-1}^{varid,1}$, open$_{j-1}^{varid,1}$)

where com$_{varid,j}^{triple}$, wcom$_{j-1}^{varid,1}$, sid, and varid are known to all th parties. If this proof is varid 1 successful, all the party output (abort, sid, $P_{j-1}$). If this proof is not successful, all the party output (abort,sid, $P_k$).

2. For each $j \in \{1,2,3\}$, $P_{j-1}$ proves to $P_j$ the knowledge of open$_{j+1}^{varid'}$, open$_{j+1}^{varid''}$, seed$_{j+1}$, open$_{j+1}^{seed}$, $[x]_{j-1,2}$[x']$_{j-1,2}$, [x'']$_{j-1,2}$, [a]$_{j-1,2}$, [b]$_{j-1,2}$[c]$_{j-1,2}$, open$_{j+1}^{varid,2}$, [r]$_{j+1,2}$, [s]$_{j+1,2}$open$_{j+1}^{varid,2}$, $Q_{j+1}$, open$_{j+1}^{varid,3}$, and ($Q'_{j+1}$, open$_{j+1}^{varid,4}$ only when $\perp_{mult\_3}$) in zeroknowledge that satisfy the following relations.

accept=Verify(com$_{j+1}^{varid'}$,[x']$_{j-1,2}$,open$_{j+1}^{varid'}$)

accept=Verify(com$_{j+1}^{varid''}$,[x'']$_{j-1,2}$,open$_{j+1}^{varid''}$)

accept=Verify(com$_{j+1}^{varid}$,[x]$_{j-1,2}$,open$_{j+1}^{varid}$)

accept=Verify(com$_{j+1}^{seed}$,seed$_{j+1}$,open$_{j+1}^{seed}$)

accept=Verify(com$_{j+1}^{varid,1}$,([a]$_{j-1,2}$[b]$_{j-1,2}$[c]$_{j-1,2}$), open$_{j+1}^{varid,1}$)

accept=Verify(com$_{j+1}^{varid,2}$,[r]$_{j+1,2}$,[s]$_{j+1,2}$, open$_{j+1}^{varid,2}$)

accept=Verify(com$_{j+1}^{varid,3}$,$Q_{j+1}$,open$_{j-1}^{varid,3}$)

accept=Verify(com$_{j+1}^{varid,4}$,$Q'_{j+1}$,open$_{j-1}^{varid,4}$)only when $\perp_{mult\_3}$)

$[x]_{j-1,1}$=[x']$_{j,2}$·[x'']$_{j,2}$+[x']$_{j,2}$·[x'']$_{j-1,2}$+[x']$_{j-1,2}$·[x'']$_{j,2}$+$Hash_\mathbb{R}$(mult_iv1,sid,varid,seed$_{j-1}$)−$Hash_\mathbb{R}$(mult_iv1,sid,varid,seed$_{j+1}$)

$[r]_{j-1,2}$=[x']$_{j-1,2}$+[a]$_{j-1,2}$,[s]$_{j-1,2}$=[x'']$_{j-1,2}$+[b]$_{j-1,2}$ $[r]_{j-1,1}$=[x']$_{j,2}$+[a]$_{j,2}$,[s]$_{j-1,1}$=[x'']$_{j,2}$+[b]$_{j,2}$ $r_{j-1}$=[r]$_{j-1,1}$+[r]$_{j-1,2}$+[r]$_{j+1,2}$,$s_{j-1}$=[s]$_{j-1,1}$+[s]$_{j-1,2}$+[s]$_{j+1,2}$ $[o]_{j-1,1}$=−[x]$_{j-1,1}$+$r_{j-1}$·[1]$_{j-1,1}$−$s_{j-1}$·[a]$_{j,2}$−$r_{j-1}$·[b]$_{j,2}$+[c]$_{j,2}$ $[o]_{j-1,2}$=−[x]$_{j-1,2}$+$r_{j-1}$·$s_{j-1}$·[1]$_{j-1,2}$−$s_{j-1}$·[a]$_{j-1,2}$−$r_{j-1}$·[b]$_{j-1,2}$+[c]$_{j-1,2}$ $Q_{j-1}$=$Hash_{\mathbb{Z}_{2^K}}$(mult_iv2,sid,varid,seed$_{j-1}$,$r_{j-1}$,$s_{j-1}$)

$Q_{j-1}$=$Hash_{\mathbb{Z}_{2^K}}$(mult_iv3,sid,varid,seed$_{j-1}$,[o]$_{j-1,2}$)

$Q_{j+1}$=$Hash_{\mathbb{Z}_{2^K}}$(mult_iv2,d sid,varid,seed$_j$,$r_{j-1}$,$s_{j-1}$) when $\perp_{mult\_2}$ $Q'_{j+1}$≠$Hash_{\mathbb{Z}_{2^K}}$(mult_iv3,sid,varid,seed$_j$,−[o]$_{j-1,1}$ [o]$_{j-1,2}$) when $\perp_{mult\_3}$ where all the parties have com$_{j+1}^{varid'}$, com$_{j+1}^{varid''}$, com$_{j+1}^{varid}$, com$_{j+1}^{seed}$, com$_{j+1}^{varid,1}$, com$_{j+1}^{varid,2}$, com$_{j+1}^{varid,3}$, com$_{j+1}^{varid,4}$, varid, varid', varid'', sid, [x']$_{j,2}$, [x'']$_{j,2}$,[x]$_{j-1,1}$, [a]$_{j,2}$, [b]$_{j,2}$, [c]$_{j,2}$, [r]$_{j-1,2}$, [s]$_{j-1,2}$, seed$_{j-1}$.

If $P_{j-1}$ fails in the proof, $P_j$ outputs (abort,sid,p$_{j-1}$).

The secure MPC protocol with identifiable abort may further utilize multiple such protocols in order to increase the throughput of the communication between the MPC agents 210. This may be highly applicable since the operations conducted by the MPC agents 210, for example, the commitments, the openings, the hash values computations and/or the like may require significantly high communication bandwidth. Moreover, applying the plurality of protocols executed concurrently may significantly reduce the communication messages. Such concurrent execution was demonstrated in the art, for example, using Kerberos authentication and/or the like. The secure MPC protocol with identifiable abort therefore may not decrease the communication throughput compared to prior art secure MPC protocols with abort.

Moreover, the communication throughput may be increased when using the secure MPC protocol with identifiable abort since some operations which are non-interactive in the prior art secure MPC protocols with abort, for example, random, addc, multc, add and/or the like are in fact interactive in the secure MPC protocol with identifiable abort. This may be achieved since the MPC agents 210 may be able to conduct underlying semi-honest secure computations without these communicating with other MPC agents 210 except for the output operation which may be executed after all verification operations are completed. In the secure MPC protocol with identifiable abort, each of the MPC agents 210 may execute each verification operation which is most of the protocol (except for the semi-honest secure part) directly after executing its relevant semi-honest secure protocol. In this way, the increase in the number of communication rounds remains in a small constant for the whole MPC computation. The secure MPC protocol with identifiable abort therefore may not increase the latency compared to prior art secure MPC protocols with abort.

However, if the MPC agents 210 execute a multiplication operation on a result of such a multiplication operations that is not completely verified yet, the security of each component multiplication may not imply the security of the whole operation. Clearly, the secure MPC protocol with identifiable abort may identify the malicious party (cheater) when aborted and may keep confidentiality when the not aborted. However, it is not obvious whether the secure MPC protocol with identifiable abort maintains fairness. This may result from the fact that the adversary may infer a hint of the shared secrets from the behavior of the cheating detection and/or the identity of the malicious party (cheater). Therefore, the secure MPC protocol with identifiable abort may therefore need to be conducted with special care and possibly with some provisions to maintain such care. A protocol $\pi_{GMPC}$, which is a hyper-concurrent variant of the protocol $\pi_{GMPC}$ may be secure when executed in such a rush manner. An exemplary hyper-concurrent $\tilde{\pi}_{GMPC}$ protocol is presented in Protocol 5 below. Theorem 7 presented herein after may prove that the exemplary hyper-concurrent $\tilde{\pi}_{GMPC}$ securely realizes the ideal functionality.

Protocol 5:

Protocol 5 (Hyper Concurrent Run of $\pi_{GMPC}$ ($\tilde{\pi}_{GMPC}$))

$\tilde{\pi}_{GMPC}$ is a hyper-concurrent run of the $\pi_{GMPC}$ and $\pi_{identify}$ for a single circuit in the following manner. Each operation is divided into semihonest secure computation and verification process. Each verification is divided in to cheater detection described within $\pi_{GMPC}$ and cheater identification described in $\pi_{identify}$. A circuit is composed of layers of gates. Each layer is a small circuit whose input is from the lower layer. Thus, the evaluation of circuit proceeds strictly from lower layer to higher layer. In each layer, that is a small circuit, an output of gate in this layer is allowed to be input to another gate in the same layer only when the former gate is not multiplication of two inputs (a gate of multiplication with a constant is allowed). Operations with respect to a computation of this circuit is schedules as in the following;

Each operation in the circuit is allowed to start based on the outputs of other operation's semihonest secure computation.

If no party broadcasts abort, for some * for the entire circuit, only then the output operations are executed.

Operations in layers are synchronized in a way that the verification of an operation in a layer always proceeds ahead of the verification of the same type of operation in the higher layer. This means that $Q_j$ and $Q'_j$, respectively, for some j in one layer should not be evaluated unless all the dependent Q, and $Q'_i$, respectively, in the lower layer are evaluated.

Whenever, a party in $\pi_{GMPC}$ broadcasts abort, for some *, stop this operation without proceeding to $\pi_{identify}$. By completing other operations within $\pi_{GMPC}$, identify one gate that outputs abort, for some*such that all of its preceding gates do not abort. Run $\pi_{identify}$ only for this gate to identify the cheater.

The malicious party (cheater) identification protocol $\pi_{identify}$ may require a lot of zero-knowledge protocols for commitment operations and/or for hash functions computations. While such operations may be extremely heavy, i.e. extensive resource demanding, for example, computation resources, communication resources and/or the like compared to the semi-honest secure computation of a single ring operation, execution of the $\pi_{identify}$ procedure may be required for only one gate in the entire computation where the cheating, i.e. the invalid share value(s) is first detected. In addition, as long as cheating is not detected, execution of the $\pi_{identify}$ procedure may never take place. Hence, the cost of cheater identification is acceptable as long as that single execution is practical. A practical execution of the $\pi_{identify}$ procedure may be achieved by efficiently using one or more techniques, for example, ZKBoo and/or the like as known in the art.

Typically, the most resource demanding case of malicious party (cheater) identification in the MPC protocol with identifiable abort may be a case of multiplication. In the case that the cheating is detected at a multiplication, the malicious party (cheater) identification may require the MPC agents 210 to prove the knowledge of the opening of commitment and compute hash functions. For example, assuming the Commit operation is instantiated by SHA-256 with k=256 and $\mathbb{R}$ is a 64-bit integer. The cost of malicious party (cheater) identification at the multiplication operation may be roughly equivalent to proving the knowledge of input of SHA-256 function for a 100 times. According to the ZKBoo technique, such a computation may be executed within 60 msec. It should be noted that using a public key primitive, for example, a signature for zero-knowledge proofs as may be done by the naïve implementation instead of applying the commitment(s) as done in the MPC protocol with identifiable abort may be too heavy with respect to resources consumption even when using the efficient ZKBoo and may thus be impractical.

As shown at 102, the process 100 starts with the plurality MPC agents 210 (parties) participating in the secure MPC to jointly compute one or more functions. The MPC agents 210 may communicate with one another to exchange data and commit their respective computed share values using the $\pi_{GMPC}$ procedure with identifiable abort. While executing the $\pi_{GMPC}$ procedure, each of the MPC agents 210 may transmit one or more secure private messages to one or more of the other MPC agents 210 and broadcast one or more broadcast messages to all the other MPC agents 210. Each of the private messages is encrypted for content protection and authentication, such that only the destination MPC agent 210 may decode each private message and identify the originating MPC agent 210 which transmitted the private message. Each of the broadcast messages is authenticated such that each of the MPC agents 210 may identify the originating MPC agent 210 which transmitted the broadcast message.

Optionally, the MPC agents 210 employ the hyper-concurrent $\tilde{\pi}_{GMPC}$ procedure which may be executed under the concurrent general composition where multiple secure MPC protocol such as the $\pi_{GMPC}$ procedure are executed concurrently in order to increase the throughput of the communication between the MPC agents 210.

As shown at 104, during one or more cycles of the MPC, one or more of the MPC agents 210 executing the MPC with identifiable abort may detect an error, i.e. an invalid share value committed by one or more potentially malicious parties among the MPC agents 210, i.e. a dishonest party, a cheater, a corrupted party and/or the like in an attempt to corrupt the secure MPC, for example, obtain the input data of one or more honest parties, affect the output of the one or more of the honest parties, affect the output of the jointly computed function and/or the like.

As shown at 106, the MPC agents 210, specifically the honest parties among the MPC agents 210 may execute the $\pi_{identify}$ procedure to verify their committed share values. Verifying the share values may be done by determining and/or identifying the agreed share values as described herein above for the $\pi_{identify}$ procedure. The honest parties among the MPC agents 210 may verify each of the committed share values against the agreed share values and thus verify the share values and identify the share values which dialed the verification, i.e. do not comply with the agreed share values. The honest parties among the MPC agents 210 may determine the agreed share values may by exchanging data with one or more of the other honest parties among the MPC agents 210 using broadcast and/or private messages. Moreover, the MPC agents 210 may use message history in order to determine one or more of the agreed share values. The message history may include a plurality of messages, either private and/or broadcast messages previously transmitted by one or more of the MPC agents 210 during one or more cycles of the secure MPC.

As shown at 108, the MPC agents 210, specifically the honest parties among the MPC agents 210 may execute the $\pi_{identify}$ procedure to identify the identity of the malicious party(s) among the MPC agents 210 (malicious computing node(s)) which committed the invalid share value(s). The honest parties among the MPC agents 210 may reconstruct the protocol from the agreed share values to the point of detection of the cheating (abort) as described herein above for the $\pi_{identify}$ procedure. By reconstructing the protocol, the honest parties among the MPC agents 210 may identify the identity of the originating MPC agent 210 which committed each of the shared values and specifically identify the identify the malicious party(s) among the MPC agents 210 which committed the invalid share value(s). Optionally, one or more of the honest parties among the MPC agents 210 may exchange data with one or more of the other MPC agents 210 using the private and/or broadcast messages in order to reconstruct the protocol. Moreover, one or more of the honest parties among the MPC agents 210 may use message history in order to reconstruct the protocol.

As shown at 110, one or more of the MPC agents 210, specifically one or more of the honest parties may output the identity of the malicious party(s) among the MPC agents 210 (malicious computing node(s)), i.e. the cheating computing node(s) (cheater(s)). The identity(s) may then be publicized in order to hurt the reputation of such malicious parties and thus deter the adversary from corrupting the secure MPC session and/or one or more future secure MPC sessions.

Performance Comparison

The complexity and performance, in particular throughput of the secure MPC protocol with identifiable abort is compared for a three party computation to secret sharing based secure MPC protocols known in the art.

The comparison of secure MPC protocols is directed to complete fairness (Fairness), the probability of cheater detection (Detect), the ratio of overhead for semihonest secure MPC (i.e. communication overhead/communication for semihonest secure MPC, the amount of communication required for data input or data update (Input/Update), reuse (Reuse), and history required for identification during the computation of a circuit (History) and the amount of additional communication required for identification (Identify). The results of the performance comparison are presented in table 1 below.

TABLE 1

| MPC Protocol | Fairness | Detect | Comm. | Input/Update | Reuse | History | Identify |
| --- | --- | --- | --- | --- | --- | --- | --- |
| [1] | — | ¼ | 2 | GMPC | GMPC | All messages | 0 |
| [2] | ✓ | 1-neg(k) | 28 | GMPC | 0 | All messages | 0 |
| [3] | ✓ | 1-neg(k) | 7 | GMPC | 0 | All messages | GMPC |
| [4] | ✓ | 1-neg(k) | 7 | 0 | 0 | — | N/A |
| [5] | ✓ | 1-neg(k) | 7 | 0 | 0 | 0 | ~60 msec |

MPC Protocol [1] designates the secret sharing based secure MPC protocol as presented in referenced document [2], the contents of which are incorporated herein by reference in their entirety. As seen in table 1, the MPC Protocol [1] enables semihonest secure MPC to detect and identify the malicious (cheating) party(s) with the probability of ¼. While the detection probability is not significantly high, the additional communication cost required to support the identification is extremely low. However, at the beginning of each cycle of the MPC Protocol [1], each party should convert each of its inputs into two inputs where one input is the genuine input and the other input is a dummy input where none of the other parties knows which is the dummy input. Since this conversion needs to be verifiable, it requires a GMPC which is secure in the presence of malicious parties. The GMPC may typically involve significant and potentially extreme communication traffic and data exchange. The same conversion is necessary when the committed share values are reused and/or updated. Moreover, as seen in table 1, The MPC Protocol [1] may fail to maintain fairness between the parties and requires storing all messages history until the relevant MPC cycle is completed.

MPC Protocol [2] designates the secret sharing based secure MPC protocol as presented in referenced document [3], the contents of which are incorporated herein by reference in their entirety. The parties applying the MPC protocol [2] may execute, simultaneously to the semihonest secure protocol, a verification protocol that may identify the malicious party(s). Although the protocol requires communicating (exchanging) multiple signatures between the parties, the parties may share these signatures among other protocols executed in parallel. Hence, signatures communication may be neglected. Each party is required to commit to all its inputs, distribute its share values to the verifier, and verify that these committed inputs and shared inputs are the same. This requires a GMPC which is secure in the presence of malicious parties for inputs and update. The MPC Protocol [2] also requires storing all messages history until the relevant MPC cycle is completed.

MPC Protocol [3] designates the secret sharing based secure MPC protocol as presented in referenced document [1], the contents of which are incorporated herein by reference in their entirety. Each party is required to commit to all its inputs, distribute its share values to the verifier, and verify that these committed inputs and shared inputs are the same. This requires a GMPC which is secure in the presence of malicious parties for inputs and update. In addition, similarly to the previously presented MPC protocols [1] and [2], all messages history may need to be stored until the relevant MPC cycle is completed.

MPC Protocol [4] designates a modified secure MPC protocol which is based on a secure MPC protocol presented in referenced document [4], the contents of which are incorporated herein by reference in their entirety. The modification may include verification of the input share values. To that end the (base) secure MPC protocol presented in the prior art item is modified to support cheater identifiability. As seen in table 1, the MPC protocol [4] does not require storing the messages history.

The MPC Protocol [5] presents the secure MPC protocol with identifiable abort as described in the present invention. As evident in table 1, The MPC Protocol [4] presents similar characteristics and performance, i.e. input, update, history management, throughput and/or the like until an abort event is detected, i.e. malicious party(s) is detected. As the MPC Protocol [4] is optimized for high throughput, the MPC Protocol [5] also presents such high throughput during normal MPC cycles until the abort event. The MPC Protocol [5] may require additional computation at each of the parties for identifying the malicious party(s). The additional computation may require extensive resources, for example, computation resources, communication resources and/or the like. However, since the additional computation is required only once following the abort event, the penalty for the additional computation may be of little significance.

Security Proof

Following is a security proof of the secure MPC protocol with identifiable abort (MPC Protocol [5]). The security proof first presents a simulated protocol of the secure MPC protocol with identifiable abort and further proves the indistinguishability of the simulated protocol and the real secure MPC protocol with identifiable abort. In the security proof presented herein, the malicious party is referred to as the adversary which may have access to a corrupted party.

Definition 5. (Simulator $S^A$) Let $P_l$ be the corrupted party. $S^A$ is an ideal adversary that interacts with the parties engaging in $\pi_{GMPC}$ and $\pi_{identify}$ in ($F_{GMPC}$)-hybrid model. It also has a black-box access to the real adversary A who corrupted $P_l$.

On receiving (setup, sid, κ) from $F_{GMPC}$, $S^A$ does the followings;

1. $S^A$ generates $seed_{l-1} \in \{0,1\}^k$, a random commitment $com_{l+1}^{seed}$, $Open_{l-1}^{seed} \in_R \{0,1\}^k$, and $com_{l-1}^{seed}$=Commit ($seed_{l-1}$, $open_{l-1}^{seed}$), $S^A$ sends $open_{l-1}^{seed}$ to $P_l$ and broadcast $com_{l-1}^{seed}$ as $P_{l-1}$ and $com_{l+1}^{seed}$ as $P_{l+1}$. $S^A$ receives $open_j^{seed}$ and $com_j^{seed}$ from A.

2. $S^A$ as $P_{l+1}$ and $P_{l-1}$ sends (setup, sid, κ) to $F_{triple}$. If a party receives (abort, sid, $P_k$) from $F_{triple}$, the party outputs (abort, sid, $P_k$) and abort the protocol. If a party receives (accept, sid) from $F_{triple}$, the party proceeds to the next step.

3. If all the above processes are successful, $S^A$ sends (accept, sid) to $F_{GMPC}$. Otherwise, it sends (abort, sid, $P_l$) to $F_{GMPC}$.

On receiving (random, sid, varid) from $F_{GMPC}$, $S^A$ does as follow:

1. $S^A$ generates $[x]_l$=$Hash_{\mathbb{R}}$(rand_iv,sid,varid,seed$_l$), $Hash_{\mathbb{R}}$(rand_iv,sid,varid,seed$_{l-1}$))

2. $S^A$ generates a random commitment $wcom_{l+1}^{varid}$, $wopen_{l-1}^{varid} \in_R \{0,1\}^k \times \{0,1\}^l$, and $wcom_{l-}^{varid}$=W commit ($[x]_{l,2}$, $wopen_{l-1}^{varid}$). $S^A$ broadcasts (random_brd, sid, varid, $wcom_{l-1}^{varid}$) as $P_{l-1}$ and (random_brd, sid, varid, $wcom_{l+1}^{varid}$) as $P_{l+1}$, and sends (random_msg, sid, varid, $wopen_{l-1}^{varid}$) to A. $S^A$ receives (random_msg, sid, varid, $wcom_j^{varid}$) and (random_msg, sid, varid, $wopen_j^{varid}$) from A.

3. $S^A$ verifies if $wopen_l^{varid}$ is a valid opening of $wcom_l^{varid}$ with respect to ($[x]_{l,1}$), and if it is not, $S^A$ broadcasts $\perp_{random}$ as $P_{l+1}$. If any party among $P_l$ (corrupted by A) and $P_{l+1}$ (simulated by $S^A$) broadcasts $\perp_{random}$, simulates the prover and plays the verifier of zeroknowledge protocol in $\pi_{identify}$, and completes simulation by sending (abort, sid, $P_l$) to $F_{GMPC}$.

4. If no one broadcasts $\perp_{random}$, $S^A$ stores (varid, ($[x]_{l,1}$, $[x]_{l,2}$), $Com_l^{varid}$, $open_l^{varid}$) and sends (accept, sid) to $F_{GMPC}$. In this case, $S^A$ completes the simulation for this request of random here.

On receiving (input, sid, varid, $P_l$) from $F_{GMPC}$ (where $P_l$ is corrupted), $S^A$ does as in the following:

1. $S^A$ receives (input_msg1, sid, $P_l$, varid, $[x]_j$, $open_j^{varid,1}$, $open_j^{varid,2}$) for j=l+1 and j=l-1 from A. $S^A$ receives (input_brd1, sid, $P_l$, varid, $com_j^{varid,1}$, $com_j^{varid,2}$, $com_j^{varid,3}$).

2. $S^A$ generates a random $wcom_{l+1}^{varid}$), $wopen_{l-1}^{varid} \in_R \{0,1\}^k \times \{0,1\}^k$, and $wcom$=wcommit($[x]_{l-1,1}$, $wopen_{l-1}^{varid}$). $S^A$ sends (input_msg2, sid, varid, $wopen_{l-1}^{varid}$) to A, broadcast (input_brd2, sid, varid, $wcom_{l-1}^{varid}$) as $P_{l-1}$ and (input_brd2, sid, varid, $wcom_{l+1}^{varid}$) as $P_{l+1}$. $S^A$ receives (input_brd2, sid, varid, $wcom_l^{varid}$) and (input_msg2, sid, varid, $wopen_l^{varid}$).

3. $S^A$ verifies if $wopen_{varid,l}$ is a valid opening of $wcom_l^{varid}$ with respect to ($[x]_{l+1,2}$).

If the opening is not valid, $S^A$ broadcasts $\perp_{input}$ as $P_{l+1}$.

If the latter equation does not hold, $S^A$ broadcasts $\perp_{input}$ as $P_{l-1}$.

If any party among $P_l$ (corrupted by A) and $P_{l-1}$ and $P_{l+1}$ (both simulated by $S^A$) broadcasts $\perp_{input}$, $S^A$ simulates the prover and plays the verifier of zeroknowledge protocol in $\pi_{identify}$, and completes simulation by sending (abort, sid, $P_l$) to $F_{GMPC}$.

4. If no one broadcasts $\perp_{input}$, $S^A$ stores (varid, ($[x]_{l+1,2}$, $[x]_{l-1,1}$), $com_l^{varid}$, $open_l^{varid}$), generates x=$[x]_{l+1,2}$+$[x]_{l-1,1}$+$[x]_{l-1,2}$, sends (accept, sid, x) to $F_{GMPC}$. In this case, $S^A$ completes the simulation for this request of input here.

On receiving (input, sid, varid, $P_k$) from $F_{GMPC}$ where $P_k$ is an uncorrupted party, $S^A$ does as the following:

1. $S^A$ generates $[x]_l$=($[x]_{l,1}$, $[x]_{l,2}$) $\in_R \mathbb{R} \times \mathbb{R}$, $open_k^{varid,l} \in_R \{0,1\}^k$, $open_k^{varid,l-1} \in_R \{0,1\}^k$, $com_k^{varid,l}$=com($[x]_{l,1}$,$open_k^{varid,l}$), $com_k^{varid,l-1}$=com($[x]_{l,2}$, $open_k^{varid,l-1}$) and a random $com_k^{varid,l+1}$. $S^A$ sends (input_msg1, sid, $P_k$, varid, $[x]_l$, $open_k^{varid,l}$, $open_k^{varid,l-1}$) to A, an broadcasts (input_brd1, sid, $P_k$, varid, $com_k^{varid,1}$, $com_k^{varid,2}$, $com_k^{varid,3}$).

2. $S^A$ also generates a random commitment $wcom_{l+1}^{varid}$, $wopen_{l-1}^{varid} \in_R \{0,1\}^k \times \{0,1\}^k$, and $wcom_{l-1}^{varid}$=Wcommit($[x]_{l,2}$, wopen$_{l-1}^{varid}$). $S^A$ sends (input_msg2, sid, varid, wopen$_{l-1}^{varid}$) to A, and broadcasts (input_brd2, sid, varid, wcom$_{l-1}^{varid}$) as $P_{l-1}$ and (input_brd2, sid, varid, wcom$_{l+1}^{varid}$) as $P_{l+1}$. $S^A$ receives the message (input_msg2, sid, varid, wopen$_l^{varid}$) and (input_brd2, sid, varid, wcom$_l^{varid}$).

3. $S^A$ verifies if wopen$_l^{varid}$ is a valid opening of wcom$_l^{varid}$ with respect to($[x]_{l,1}$), and if it is not, $S^A$ broadcasts $\perp_{input}$ as $P_{l+1}$. If any party among $P_l$ (corrupted by A) and $P_{l+1}$ (simulated by $S^A$) broadcasts $\perp_{input}$, $S^A$ simulates the prover and plays the verifier of zeroknowledge protocol in $\pi_{identify}$, and completes simulation by sending (abort, sid, $P_l$) to $F_{GMPC}$.

4. If no one broadcasts $\perp_{input}$, $S^A$ stores (varid, ($[x]_{l,1}$, $[x]_{l,2}$), com$_l^{varid}$, open$_l^{varid}$) and sends (accept, sid) to $F_{GMPC}$. In this case, $S^A$ completes the simulation for this request of input here.

On receiving (output, sid, varid, $P_k$) from $F_{GMPC}$, where (varid,$[x]_l$,com$_l^{varid}$, open$_l^{varid}$) is stored and $P_k$ is not the corrupted party, $S^A$ does as in the following;

1. $S^A$ receives a message that A, as $P_l$, sends to $P_k$.
2. $S^A$ sends (accept, sid) to $F_{GMPC}$.

On receiving (output, sid, varid, $P_l$) from $F_{GMPC}$, where (varid,$[x]_l$, com$_l^{varid}$, open$_l^{varid}$) is stored where $P_l$ is the corrupted party, S does as in the following;

1. S, as $P_l$, receives (value, sid, varid, x) from $F_{GMPC}$.
2. S generates the following messages $[x]_{l+1,1} = x - [x]_{l,1} - [x]_{l,2}$, $[x]_{l+1,2} = [x]_{l,1}$, $[x]_{l-1,1} = [x]_{l,2}$, $[x]_{l-1,2} = [x]_{l+1,1}$ open$_{l+1}^{varid} \in_R \{0,1\}^k$, com$_{l+1}^{varid}$Commit($[x]_{l+1,1}$, open$_{l+1}^{varid}$)

3. $S^A$, as $P_{l+1}$, sends (output_msg, sid, varid, $[x]_{l+1}$, open$_l^{varid}$) to A. $S^A$, as $P_{l-1}$, sends (output_msg, sid, varid, $[x]_{l-1}$, open$_{l+1}^{varid}$) to A.

On receiving (addc, sid, varid, varid', v)/(multc, sid, varid, varid', v)/(add, sid, varid, varid', v) from $F_{GMPC}$ where (varid', $[x']_l$, com$_l^{varid'}$, open$_l^{varid'}$) is stored, (varid'', $[x'']_l$, com$_l^{varid''}$, open$_l^{varid''}$) is stored if add, v ∈ ℝ if addc or multc, and varid is a new index. S does as in the following;

1. $S^A$ generates a random commitment wcom$_{l+1}^{varid}$ and;

$$[x_{varid}]_\ell = \begin{cases} ([x']_{\ell,1} + v \cdot [1]_{\ell,1}, [x']_{\ell,2} + v \cdot [1]_{\ell,2}) & \text{if } addc \\ ([x']_{\ell,1} \cdot v, [x']_{\ell,2} \cdot v) & \text{if } multc \\ ([x']_{\ell,1} + [x'']_{\ell,1}, [x']_{\ell,2} + [x'']_{\ell,2}) & \text{if } add \end{cases}$$

wopen$_{\ell-1}^{varid} \in_R \{0,1\}^k$, wcom$_{\ell-1}^{varid} = W$ commit($[x]_{\ell,2}$, wopen$_{\ell-1}^{varid}$)

2. $S^A$ sends (addc_msg/multc_msg/add_msg, sid, varid, wopen$_{l-1}^{varid}$) to A. $S^A$ broadcasts (addc_brd/multc_brd/add_brd, sid, varid, wcom$_{l-1}^{varid}$) and (addc_brd/multc_brd/add_brd, sid, varid,wcom$_{l+1}^{varid}$). $S^A$, as $P_{l+1}$, receives (addc_msg/multc_msg/add_msg, sid, varid, wopen$_l^{varid}$) and (addc_brd/mult_brd/add_brd, sid, varid, wcom$_l^{varid}$) from A.

3. $S^A$ verifies if wopen$_l^{varid}$ is a valid opening of wcom$_l^{varid}$ with respect t ($[x]_{l,1}$), and if it is not valid, $S^A$ broadcasts $\perp_{addc/multc/add}$ as $P_{l+1}$. If any party among $P_l$ (corrupted by A) and $P_{l+1}$ (simulated by $S^A$) broadcasts $\perp_{add/multc/add}$, $S^A$ simulates the prover and plays the verifier of zeroknowledge protocol in $\pi_{identify}$, and completes simulation by sending (abort, sid, $P_l$) to $F_{GMPC}$.

4. If no one broadcasts $\perp_{addc/multc/add}$, $S^A$ stores (varid, $[x]_l$, com$_l^{varid}$, open$_l^{varid}$) and sends (accept, sid) to $F_{GMPC}$. In this case, $S^A$ completes the simulation for this request of addc/multc/add here.

On receiving (malt, sid, varid, varid', varid'') where (varid', $[x']_l$, com$_l^{varid'}$, open$_l^{varid'}$) and (varid'', $[x'']_l$, com$_l^{varid''}$, open$_l^{varid''}$) are stored, and varid is a new index, $S^A$ does as in the following.

1. $S^A$ generates a random commitmentcom$_{l+1}^{varid}$, $[x]_{l-1,1} \in_R \mathbb{R}$, open$_{l-1}^{varid} \in_R \{0,1\}^k$, and com$_{l-1}^{varid}$=Commit($[x]_{l-1,1}$, open$_{l-1}^{varid}$), 2. $S^A$ sends (mult_msg1, sid, varid, $[x]_{l-1,1}$, open$_{l-1}^{varid}$) to A, and broadcasts (mult_brd1, sid, varid, com$_{l-1}^{varid}$) as $P_{l-1}$ and (mult_brd1, sid, varid, com$_{l+1}^{varid}$) as $P_{l+1}$. $S^A$ receives (mult_msg1, sid, varid,$[x]_{l,1}$, open$_l^{varid}$) and (mult_brd1, sid, varid, com$_l^{varid}$) from A.

3. $S^A$ lets $P_{l+1}$ and $P_{l-1}$ send (triple, sid, varid) to $F_{triple}$, and $S^A$ receives (triple, sid, varid) from $F_{triple}$, which is forwarded to A. Then, $S^A$ receives (accept, sid, ($[a]_l$, $[b]_l$, $[c]_l$)) from $F_{triple}$ 4. $S^A$ generates a random commitment com$_{l+1}^{varid,2}$ and verifiable commitment wcom$_{l+1}^{varid,1}$, and;

$[r]_{l-1,2} \in_R \mathbb{R}_{varid}$, $[s]_{l-1,2} \in_R \mathbb{R}_{varid}$, wopen$_{l-1}^{varid,1} \in_R \{0,1\}^k \times \{0,1\}^k$, wcom$_{l-1}^{varid,1}$=Wcommit(($[a]_{l,2}$, $[b]_{l,2}$, $[c]_{l,2}$), wopen$_{l-1}^{varid,1}$) open$_{l-1}^{varid,2} \in_R \{0,1\}^k$, com$_{l-1}^{varid,2}$=Commit((($[r]_{l-1,2}$, $[s]_{l-1,2}$), open$_{l-1}^{varid,2}$) (mult_msg2, sid, varid, $[r]_{l-1,2}$, $[s]_{l-1,2}$, wopen$_{l-1}^{varid,1}$, open$_{l-1}^{varid,2}$) to A. $S^A$ broadcasts (mult_brd2, sid, varid, wcom$_{l-1}^{varid,1}$, com$_{l-1}^{varid,2}$) as $P_{l-1}$ and (mult_brd2, sid, varid, wcom$_{l+1}^{varid,1}$, com$_{l+1}^{varid,2}$) as $P_{k+1}$. $S^A$ receives (mult_msg_2, sid, varid, $[r]_{l,2}$, $[s]_{l,2}$, wopen$_l^{varid,1}$, open$_{l+1}^{varid,2}$) and (mult_brd2, sid,varid,wcom$_l^{varid,1}$, com$_l^{varid,2}$) from A.

6. $S^A$ verifies if wopen$_l^{varid,1}$ is a valid opening of wcom$_l^{varid,1}$ with respect to ($[a]_{l,1}$, $[b]_{l,1}$, $[c]_{l,1}$), and if it is not, $S^A$ broadcasts $\perp_{mult\_1}$ as $P_{l+1}$. If any of the parties has broadcasted $\perp_{mult\_1}$, $S^A$ proceeds to Step (12).

7. $S^A$ generates the following values in order to simulate $Q_{l-1}$ and $Q'_{l-1}$ that $P_{l-1}$ sends to $P_l$, when $P_{l+1}$ rejects $Q_l$ and $Q'_l$, and when $P_{l-1}$ rejects $Q_{l+1}$ and $Q'_{l+1}$. Note that $P_{l+1}$ may accept even if $P_l$ deviates the protocol and $P_{l-1}$ may reject $P_{l+1}$ although $P_{l+1}$ is honest. This is because $P_l$ is controlling some of values they use.

$p_l$=Hash$_\mathbb{R}$(mult_iv1,sid,varid, seed$_l$)-Hash$_\mathbb{R}$(mult_iv1,sid,varid,seed$_{l-1}$)

$[\bar{x}]_{l,1}=[x']_{l,1} \cdot [x'']_{l,1}+[x']_{l,1} \cdot [x'']_{l,2}+[x']_{l,2} \cdot [x'']_{l,1}+\rho_l$ $[\bar{x}]_l=([\bar{x}]_{l,1},[x]_{l-1,1}),[\bar{r}]_l=[x']_l+[a]_l,[\bar{s}]_l=[x'']_l+[b]_l$ $r_{l-1}=[r]_{l-1,2}+[\bar{r}]_{l,1}+[\bar{r}]_{l,2},s_{l-1}=[s]_{l-1,2}+[\bar{s}]_{l,1}+[\bar{s}]_{l,2}$ $Q_{l-1}$=Hash$_{\mathbb{Z}_{2^k}}$(mult_iv2,sid,varid,seed$_{l-1}$,$r_{l-1}$,$s_{l-1}$)

open$_{l-1}^{varid,3} \in_R \{0,1\}^k$,com$_{l-1}^{varid,3}$=Commit($Q_{l-1}$, open$_{l-1}^{varid,3}$)

open$_{l+1}^{varid,3}$,open$_{l+1}^{varid,4}$=random commitments $r_{l+1}=[r]_{l-1,2}+[\bar{r}]_{l,1}+[r]_{l,2},s_{l+1}=[s]_{l-1,2}+[\bar{s}]_{l,1}+[s]_{l,2}$ $[o]_{l-1,2}=([x]_{l,2}+[\bar{x}]_{l,1})-r_{l-1} \cdot s_{l-1} \cdot ([1]_{l,2}+[1]_{l+1,2})+s_{l-1} \cdot ([a]_{l,2}+[a]_{l,1})+r_{l-1} \cdot ([b]_{l,2}+[b]_{l,1})-([c]_{l,2}+[c]_{l+1,2})$ $Q'_{l-1}$=Hash$_{\mathbb{Z}_{2^k}}$(mult_iv3,sid,varid,seed$_{l-1}$,$[o]_{l-1,2}$)

open$_{l-1}^{varid,4} \in_R \{0,1\}^k$,com$_{l-1}^{varid,4}$=Commit($Q'_{l-1}$, open$_{l-1}^{varid,4}$)-$[o]_{l-1,1}$,$[o]_{l-1,2}$=-$[\bar{x}]_{l,1}+r_{l-1} \cdot s_{l-1} \cdot [1]_{l+1,2}-s_{l-1} \cdot [a]_{l,1}-r_{l-1} \cdot [b]_{l,1}+[c]_{l-1,2}$ $[o]_{l+1,2}$=-$[x]_{l,1}+r_{l-1} \cdot s_{l-1} \cdot [1]_{l+1,2}-s_{l-1} \cdot [a]_{l,1}-r_{l-1} \cdot [b]_{l,1}+[c]_{l,1}$ $[o]_{l+1,1}$=($[x]_{l+1}+[\bar{x}]_{l,1}$)-$r_{l-1} \cdot s_{l-1} \cdot ([1]_{l,1}+[1]_{l,1}$)
$(+s_{l-1} \cdot ([a]_{l,1}+[a]_{l-1,1})+r_{l-1} \cdot ([b]_{l,1}+[b]_{l-1,1})-([c]_{l,1}+[c]_{l-1,1})$ $-[o]_{l+1,1}[o]_{l+1,2}=-([x]_{l-1}+[\bar{x}]_{l,1}[x]_{l,1})+r_{l-1}\cdot s_{l-1}\cdot[1]_{l-1,1}$ $-s_{l-1}\cdot[a]_{l,2}-r_{l-1}\cdot[b]_{l,2}+[c]_{l,2}$ 8. $S^A$ broadcasts (mult_brd3, sid, varid, $com_{l-1}^{varid,3}$) as $P_{l-1}$ and (mult_brd3, sid, varid, $com_{l+1}^{varid,3}$) as $P_{l+1}$. $S^A$ sends (mult_msg3, sid, varid, $Q_{l-1}$, $open_{l-1}^{varid,3}$) to A. $S^A$ receives (mult_msg3, sid, varid, $Q_l$, $open_l^{varid,3}$) and (mult_brd3, sid, varid, $com_l^{varid,3}$) from A.

9. $S^A$ verifies if $\perp_{mult\_2}$ should be broadcast:

If $Q_l = Hash_{\mathbb{Z}_{2^\kappa}}$ (mult_iv2, sid, varid, $seed_l$, $r_{l+1}$, $s_{l+1}$) does not hold, $S^A$ broadcasts $\perp_{mult\_2}$ as $P_{l+1}$.

If $(r_{l+1}, s_{l+1})=(r_{l-1}, s_{l-1})$ does not hold, $S^A$ broadcasts $\perp_{mult\_2}$ as $P_{l-1}$ A broadcast $\perp_{mult\_2}$ as $P_l$.

If any of the parties has broadcasted $\perp_{mult\_2}$, $S^A$ proceeds to Step (12).

10. $S^A$ broadcasts (mult_brd4, sid, varid, $com_{l-1}^{varid,4}$) as $P_{l-1}$ and (mult_brd4, sid, varid, $com_{l+1}^{varid,4}$) as $P_{l+1}$. $S^A$ sends (mult_msg4, sid, varid, $Q'_{l-1}$, $open_{l-1}^{varid,4}$) to A. $S^A$ receives (mult_msg4, sid, varid, $Q'_l$, $open_l^{varid,4}$) and (mult_brd4, sid, varid, $com_l^{varid,3}$) from A.

11. $S^A$ verifies if $\perp_{mult\_3}$ should be broadcast:

If $Q'_l = Hash_{\mathbb{Z}_{2^\kappa}}$ (mult_iv2, sid, varid, $seed_l$, $-[o]_{l+1,1}-[o]_{l+1,2}$) does not hold, $S^A$ broadcasts $\perp_{mult\_3}$ as $P_{l+1}$.

If $[o]_{l+1,2}=-[o]_{l-1,1}-[o]_{l-1,2}$ does not hold, $S^A$ broadcasts $\perp_{mult\_3}$ as $P_l$.

A broadcast $\perp_{mult\_3}$ as $P_l$.

If any of the parties has broadcasted $\perp_{mult\_3}$, $S^A$ proceeds to Step (12).

12. If $\perp_{mult\_1}$ is broadcast, $S^A$ sends (verify, sid, varid) as such $P_j \in \{P_{l+1}, P_{l-1}\}$ that broadcasted $\perp_{mult\_1}$. Then it receives (accept, sid, varid, $com_{varid,j}^{triple}$) and (accept, sid, varid, $([a]_j, [b]_j, [c]_j)$, $open_{varid,j}^{triple}$) for any party $P_j$ that requires to do so.

13. $S^A$ simulates the prover and plays the verifier of zeroknowledge protocol in $\pi_{identify}$, and completes simulation by sending (abort, sid, $P_l$) to $F_{GMPC}$.

Theorem 6. $\pi_{GMPC}$, which is followed by $\pi_{identify}$ when a party aborts, in $F_{triple}$-hybrid model securely realizes $F_{GMPC}$.

Proof. The difference between simulated view and the real view is only in two sequences. In the view of real execution, some values are computed by pseudorandom function with the input of this $seed_{l+1}$. In simulated view, these are random values. These are in the following.

Setup: The real protocol and simulated protocol differ in that $com_{l+1}^{seed}$ in the real protocol is replaced by a commitment to a random string in the simulated protocol. Others are the same or simulated. Therefore, as long as commitment is hiding, they cannot be distinguished.

Random: The distributions of real protocol and simulated protocol differ in the sequence of $\{x\}_{varid}$ unless the protocol is aborted. Note that these values are implicitly parametrized by varid. They are;

In a real protocol, $\{Hash_{\mathbb{R}}(rand\_iv, sid, varid, seed_{l+1})+Hash_{\mathbb{R}}(rand\_iv, sid, varid, seed_l)+Hash_{\mathbb{R}}(rand\_iv, sid, varid, seed_{l-1})\}_{varid}$.

In a simulated protocol, $\{x \in \mathbb{R}_{varid}\}_{varid}$.

This difference comes from the fact that, while the real protocol $\pi_{GMPC}$ determines it by pseudorandom function with the input of $seed_{l+1}$, $F_{GMC}$ generates if from randomly chosen x.

The only way for the adversary to abort the protocol is $wopen_l^{varid}$ is not a valid opening of $wcom_l^{varid}$ with respect to $[x]_{l,1}$ of varid.

The adversary broadcasts $\perp_{random}$.

In the first case, A simply fails in proof in the real protocol as there is no other $[x]_{l,1}$ that A can prove for which $wopen^v ar_l$ is a valid opening of $wcom_l^{varid}$. This simulation is straightforward. In the second case, A again simply fails in zeroknowledge proof in the real protocol as $P_{l-1}$'s is honest and its output is totally independent to A. This simulation is direct. These cases are consistent to $S^A$'s sending (abort, sid, $P_l$) to $F_{GMPC}$.

Therefore, the real protocol and simulated protocol differ only in that above sequences. As long as pseudorandom number functions are indistinguishable, they cannot be distinguished.

Input by uncorrupted party: As the simulator succeeds in extraction of the input value x, the distributions of real protocol and simulated protocol are the same as long as all the parties are honest.

The only way for the adversary to abort the protocol is $wopen_l^{varid}$ is not a valid opening of $wcom_l^{varid}$ with respect to $[x]_{l,1}$ of varid.

The adversary broadcasts $\perp_{input}$.

In the first case, A simply fails in proof as a commitment A himself generated as the dealer is share by $([x]_{l+1,2})$ and $([x]_{l,1})$. The binding property of $com^{varid}$ and $wcom_l^{varid}$ does not allow $([x]_{l+1,2}) \neq ([x]_{l,1})$. This simulation is straightforward. In the third case, A again simply fails in zeroknowledge proof in the real protocol as $P_{l-1}$'s is honest and its output is totally independent to A. This simulation is direct. These cases are consistent to $S^A$'s sending (abort, sid, $P_l$) to $F_{GMPC}$. Therefore, the real protocol and simulated protocol are indistinguishable.

Input by the corrupted party: As the $P_l$'s shares of the any input is indistinguishable from those of a random secret, the distributions of real protocol and simulated protocol are the same as long as all the parties are honest. The only ways for the adversary to abort the protocol is $wopen_l^{varid}$ is not a valid opening of $wcom_l^{varid}$ with respect to $[x]_{l,1}$ of varid.

The adversary broadcasts $\perp_{input}$

In the first case, A simply fails in proof as the dealer committed to $[x]_{l,1}$. This simulation is straightforward. In the second case, A again simply fails in zeroknowledge proof in the real protocol since $wopen_{l-1}^{varid}$ is a valid opening of $wcom_{l-1}^{varid}$ with respect to $[x]_{l,2}$. This simulation is straightforward. These cases are consistent to $S^A$'s sending (abort, sid, $P_l$) to $F_{GMPC}$. Therefore, the real protocol and simulated protocol are indistinguishable.

Output when the receiver is not the corrupted party: As A's behavior does not affect $S^A$'s simulation. $S^A$ stores (varid,$[x]_l$, $com_l^{varid}$, $open_l^{varid}$) only when the previous protocol is completed successfully and $open_l^{varid}$ is a valid opening of $com_l^{varid}$ with respect to $[x]_{l,1}$. Hence, that the $S^A$ has such data that guarantees what $S^A$ sends (accept, sid) to $F_{GMPC}$ is a perfect simulation. Therefore, the real protocol and simulated protocol are indistinguishable.

Output when the receiver is the corrupted party: Once the share of A and the secret is fixed, the rest of shares are determined. As these shares are generated perfectly by $S^A$, the real protocol and the simulated protocol are indistinguishable.

Addition with Constant, Multiplication with Constant, and Addition: As long as A behaves honestly, the distribution of the real protocol and the simulated protocol are the same. The only ways for the adversary to abort the protocol is wopen$_l^{varid}$ is not a valid opening of wcom$_l^{varid}$ with respect to [x]$_{l,1}$ of varid.

The adversary broadcasts ⊥$_{addc/multc/add}$.

In the first case, A simply fails in proof as this value is simulated perfectly. This simulation is straightforward. In the second case, A again simply fails in zeroknowledge proof in the real protocol as wopen$_{l-1}^{varid}$ is a valid opening of wcom$_{l-1}^{varid}$ with respect to [x]$_{l,2}$. This simulation is direct. These cases are consistent to S$^A$'s sending (abort, sid, P$_l$) to F$_{GMPC}$. Therefore, the distribution of the real protocol and simulated protocol are the same.

Multiplication: The distributions of the real protocol and the simulated protocol differ in the sequence of $\{[x]_{l-1,1}, [c]_{l-1,1}, [r]_{l-1,2}, [s]_{l-1,2}\}_{varid}$. They are, in the real protocol, $\{[x]_{l,2}\cdot[x'']_{l,2}+[x']_{l,2}\cdot[x'']_{l-1,2}+[x']_{l-1,2}$·

[x'']$_{l,2}$+ $Hash_\mathbb{R}$ (mult_iv1,sid,varid, seed$_{l-1}$)– $Hash_\mathbb{R}$ (mult_iv1,sid,varid,seed$_{l+1}$),

[a]$_{l,2}$·[b]$_{l,2}$+[a]$_{l,2}$·[b]$_{l-1,2}$+[a]$_{l-1,2}$·[b]$_{l,2}$+$Hash_\mathbb{R}$ (triple_ivc,i,seed$_{l-1}$)– $Hash_\mathbb{R}$ (triple_ivc,i,seed$_{l+1}$)

[x']|$_{l-1,2}$+ $Hash_\mathbb{R}$ (triple_iva,i,seed$_{l+1}$),

[x'']$_{l-1,2}$+ $Hash_\mathbb{R}$ (triple_ivb,i,seed$_{l+1}$)$\}_{varid}$ where as they are random numbers in the simulated protocol. All the values in the real protocol includes pseudorandom number generated from seed$_{l+1}$.

The only ways for the adversary to abort the protocol is,

Maneuver P$_{l+1}$ to send Q$_{l+1}$ that is not $Hash_{\mathbb{Z}_{2^\kappa}}$ (mult_iv2, sid, varid, seed$_{l+1}$, r$_{l-1}$, s$_{l-1}$) to P$_{l-1}$. This can be done by adjusting the value of ([r]$_{l,2}$, [s]$_{l,2}$) that A sends to P$_{l+1}$.

Send Q$_l$ that is not $Hash_{\mathbb{Z}_{2^\kappa}}$ (mult_iv2, sid, varid, seed$_l$, r$_{l+1}$, s$_{l+1}$) to P$_{l+1}$.

Maneuver P$_{l-1}$ to send Q$_{l-1}$ that is not $Hash_{\mathbb{Z}_{2^\kappa}}$ (mult_iv2, sid, varid, seed$_{l-1}$, r$_{l-1}$, s$_{l-1}$) to P$_l$.

Maneuver P$_{l+1}$ to send Q'$_{l+1}$ that is not $Hash_{\mathbb{Z}_{2^\kappa}}$ (mult_iv3, sid, varid, seed$_{l+1}$, [o]$_{l-1,1}$–[o]$_{l-1,2}$) to P$_{l-1}$. This can be done by adjusting the value of [x$_{varid}$]$_{l,1}$ that A sends to P$_{l+1}$.

Send Q'$_l$ that is not $Hash_{\mathbb{Z}_{2^\kappa}}$ (mult_iv3, sid, varid, seed$_l$, [o]$_{l+1,1}$–[o]$_{l+1,2}$) to P$_{l+1}$.

Maneuver P$_{l-1}$ to send Q'$_{l-1}$ that is not $Hash_{\mathbb{Z}_{2^\kappa}}$ (mult_iv3, sid, varid, seed$_{l-1}$, –[o]$_{l,1}$–[o]$_{l,2}$) to P$_{l-1}$. As A is not able to control any of the value used in this verification, A cannot abort the protocol by this maneuver.

The adversary broadcasts ⊥$_{mult\_1/mult\_2}$.

In the first case, since S$^A$ is able to simulate r$_{l-1}$ and s$_{l-1}$ accurately, S$^A$ as P$_{l-1}$ broadcasts ⊥$_{mult\_2}$ exactly when it should as in the real protocol. In other words, Q$_{l+1}$ is maneuvered by A through ([r]$_{l,2}$, [s]$_{l,2}$), but this is accurately simulated by S$^A$. This case occurs only when P$_l$ deviates from the protocol and P$_{l+1}$ is able to prove its cheating in the real protocol. This is consistent to S$^A$'s sending (abort, sid, P$_l$) to F$_{GMPC}$. All the simulation of proofs between players are straightforward.

In the second case, since S$^A$ is able to simulate r$_{l+1}$ and s$_{l+1}$ accurately, S$^A$ as P$_{l+1}$ broadcasts ⊥$_{mult\_2}$ exactly when it should as in the real protocol. As r$_{l+1}$ and s$_{l+1}$ are maneuvered by ([r]$_{l,2}$, [s]$_{l,2}$), P$_{l+1}$ is not always expected to detect the cheating by the verification of the equation. However, this cheating is always detected by P$_{l-1}$, and then P$_{l+1}$ is able to identify P$_l$ as the cheater as P$_l$ should fail to prove that it did send the correct ([r]$_{l,2}$, [s]$_{l,2}$). This is consistent to S$^A$'s sending (abort, sid, P$_l$) to F$_{GMPC}$. All the simulation of proofs between players are straightforward.

In the third case, (r$_{l-1}$, s$_{l-1}$)=(r$_l$, s$_l$) if P$_l$ generates the latter pair honestly, S$^A$ is able to simulate exactly the Q$_{l-1}$ that P$_{l-1}$ should generate in the real protocol. Hence, in case P$_l$ outputs ⊥$_{mult\_2}$, P$_{l+1}$ is able to identify P$_l$ as the cheater as P$_l$ should fail to prove that its decision against P$_{l-1}$ was correct. This is consistent to S$^A$'s sending (abort, sid, P$_l$) to F$_{GMPC}$.

If no one has broadcasted ⊥$_{mult\_2}$, that all the parties agreed that r$_1$=r$_2$=r$_3$ and s$_1$=s$_2$=s$_3$. This is assumed in the below.

In the fourth case, A is able to maneuver P$_{l+1}$'s computation of Q'$_{l+1}$ but is not able to maneuver P$_{l-1}$'s verification. This is precisely simulated by S$^A$ as S$^A$ is able to simulate maneuvered Q'$_{l+1}$. P$_{l+1}$ broadcasts ⊥$_{mult\_3}$ as P$_{l-1}$ exactly when it should as in the real protocol. The simulator precisely does the simulation of this phenomenon. In case ⊥$_{mult\_3}$ is broadcasted, P$_{l+1}$ is able to prove that P$_l$'s cheating in the real protocol. Hence, this is consistent to S$^A$'s sending (abort, sid, P$_l$) to F$_{GMPC}$. All the simulation of proofs between players are straightforward.

In the fifth case, since S$^A$ is able to simulate maneuvered–[o]$_{l+1,1}$–[o]$_{l+1,2}$ accurately, S$^A$ as P$_{l+1}$ broadcasts ⊥$_{mult\_3}$ exactly when it should as in the real protocol. As –[o]$_{l+1,1}$–[o]$_{l+1,2}$ is maneuvered by [x]$_{l,1}$, P$_{l+1}$ is not always expected to detect the cheating by the verification of the equation. However, this cheating is detected when P$_l$ is required to prove to all the parties that P$_l$ generated [x]$_{l+1,2}$ correctly. Hence, as long as cheating is detected, the cheater is correctly identified. This is consistent to S$^A$'s sending (abort, sid, P$_l$) to F$_{GMPC}$. All the simulation of proofs between players are straightforward.

Theorem 7. π$_{gmpc}$ in F$_{triple}$-hybrid model realizes F$_{GMPC}$.

Proof. The simulation of the protocol for the entire circuit is simply running the simulator for all gates with few exceptions.

Setup: As the setup is independent to other operations, the simulation is the same.

Random: The simulation of random ring element generation does not directly depend on the result of other operations (outputs of other gates). It only depends on how A behaves and dependency to other result is only via A. Hence, the simulation is the same.

Input: The simulation of input operation does not directly depend on the result of other operations (outputs of other gates). It only depends on how A behaves and dependency to other result is only via A. Hence, the simulation is the same.

Output: The output operation is only after every verification is completed. Hence, the simulation is the same.

Addition and Multiplication with Constant, Addition, Multiplication: The input to the simulator is (varid,[x']$_l$, com$_l^{varid'}$, open$_l^{varid'}$) and (varid, [x'']$_l$, com$_l^{varid''}$, open$_l^{varid''}$. The latter is only for addition and multiplication. Since the simulator does not use com$_l^{varid'}$, open$_l^{varid'}$, com$_l^{varid''}$, and open$_l^{varid''}$, unless it simulates π$_{identify}$, and since the protocol does not run π$_{identify}$ until every other related verification is completed without abort, simulation with respect to these commitments and openings are by the same algorithm. More concretely, the simulator does not need to simulate related values when until it comes to the point that simulates π$_{identify}$, and when it comes to that point, it has them as every related simulation is completed.

Now the issue is how to prepare right [x']$_l$ and [x'']$_l$ for the simulator. We explain only for the [x'']$_l$ because the logic is the same for [x'']$_l$.

In case x' is the output of addition of y and z. The simulator generates $[x']_i=[y]_i+[z]_i$ where $[y]_i$ and $[z]_i$ are what the simulator prepared before.

In case x' is the output of addition of y and v. The simulator generates $[x']_i=[y]_i+[v]_i$ where $[y]_i$ is what the simulator prepared before and the constant v is known.

In case x' is the output of multiplication of y and v. The simulator generates $[x']_i=[y]_i\cdot v$ where $[y]_i$ is what the simulator prepared before and the constant v is known.

In case x' is the multiplication of addition of y and v. The simulator generates $[x]_{i,1}$ from the data A sends to $P_i$. The simulator generates $[x']_{i,2}$ by the same method that original simulator generates $[x]_{i-1,1}$ (randomly) and sends to A.

The original simulator depends on the assumptions that $[x']_{i+1,1}=[x'']_{i-1,2}$ holds, $[x']_{i+1,2}$ is $[x'']_{i,1}$ and $[x']_{i-1,1}$ is $[x'']_{i,2}$ for its validity of simulation. These assumptions always hold in semihonest secure protocol because either they are the pair of sum of pairs of equal values (when acid/addc), they are the pair of equal values multiplied by the same number (when multc), or $P_{i+1}$ sends this very value to $P_{i-1}$ (when mult). Therefore, even the multiplication is maneuvered maliciously; the simulator simulates the execution that is computationally indistinguishable to the real one.

It is expected that during the life of a patent maturing from this application many relevant systems, methods and computer programs will be developed and the scope of the terms MPC detection procedure, algorithms and/or technique are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A system for identifying at least one malicious party participating in a secure multi-party computation (MPC), comprising:
    at least one of a plurality of computing nodes communicating with said plurality of computing nodes through at least one network, wherein said at least one computing node comprising at least one processor adapted to execute a code, said code comprising:
        code instructions to participate in an MPC with said plurality of computing nodes using at least one secure protocol established over said at least one network, said at least one secure protocol supporting transmittal of private messages to each of said plurality of computing nodes and transmittal of broadcast messages to all said plurality of computing nodes;
        code instructions to detect at least one invalid share value of a plurality of share values computed and committed by said plurality of computing nodes during said MPC;
        code instructions to verify each of said plurality of share values against a plurality of agreed share values determined by exchanging data between the plurality of computing nodes participating in said MPC through a plurality of said broadcast messages and said private messages, said plurality of agreed share values are valid for said MPC;
        code instructions to identify an identity of at least one malicious computing node of said computing nodes which committed said at least one invalid share value failing said verification, wherein said identification is based on a reconstruction of said at least one secure protocol from said plurality of agreed share values to identify, for each of said plurality of share values, an originating computing node which committed said each of said share values; and
        code instructions to output said identity.

2. The system of claim 1, wherein said at least one malicious computing node constitutes a minority among said plurality of computing nodes.

3. The system of claim 1, wherein at least one of said plurality of agreed share values is determined based on a data exchanged between said plurality of computing nodes transmitting said plurality of broadcast messages and private messages after said detection.

4. The system of claim 1, wherein at least one of said plurality of agreed share values is determined based on a data exchanged between said plurality of computing nodes transmitting said plurality of broadcast messages and private messages prior to said detection.

5. The system of claim 1, wherein said reconstruction is done based on data exchanged between said plurality of computing nodes transmitting said plurality of broadcast messages and private messages.

6. The system of claim 1, wherein said code further comprising code instructions to execute concurrently a plurality of instances of said at least one secure protocol.

7. The system of claim 1, wherein each of said plurality of broadcast messages is encoded for authentication of an originating computing node of said each broadcast message.

8. The system of claim 1, wherein each of said plurality of private messages is encrypted for authentication of said each private message, wherein said authentication comprising authentication of a content of said each private message and authentication of an originating computing node of said each private message.

9. The system of claim 8, wherein at least one of said plurality of private messages is encrypted using a random process applying at least one seed committed by at least one pseudorandom function.

10. A computer implemented method of identifying at least one malicious party participating in a secure multi-party computation (MPC), comprising:

using at least one processor of at least one of a plurality of computing nodes communicating with said plurality of computing nodes through at least one network, wherein said at least one processor is adapted to execute a code for:

participating in an MPC with said plurality of computing nodes using at least one secure protocol established over said at least one network, said at least one secure protocol supporting transmittal of private messages to each of said plurality of computing nodes and transmittal of broadcast messages to all said plurality of computing nodes;

detecting at least one invalid share value of a plurality of share values computed and committed by said plurality of computing nodes during said MPC;

verifying each of said plurality of share values against a plurality of agreed share values determined by exchanging data between the plurality of computing nodes participating in said MPC through a plurality of said broadcast messages and said private messages, said plurality of agreed share values are valid for said MPC;

identifying an identity of at least one malicious computing node of said computing nodes which committed said at least one invalid share value failing said verification, wherein said identification is based on a reconstruction of said at least one secure protocol from said plurality of agreed share values to identify, for each of said plurality of share values, an originating computing node which committed said each of said share values; and outputting said identity.

11. The method of claim 10, wherein said reconstruction is done based on data exchanged between said plurality of computing nodes transmitting said plurality of broadcast messages and private messages.

* * * * *

UNITED STATES PATENT AND TRADEMARK OFFICE
CERTIFICATE OF CORRECTION

PATENT NO. : 11,050,762 B2  
APPLICATION NO. : 16/028464  
DATED : June 29, 2021  
INVENTOR(S) : Jun Furukawa et al.

Page 1 of 1

It is certified that error appears in the above-identified patent and that said Letters Patent is hereby corrected as shown below:

On the Title Page

Item (73) Assignees, Line 2:  
"Bar-Iian University" should be changed to -- Bar-Ilan University --

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*